(12) United States Patent
Kim et al.

(10) Patent No.: US 11,750,347 B2
(45) Date of Patent: Sep. 5, 2023

(54) METHOD AND APPARATUS FOR TRANSMITTING SRS IN WIRELESS CELLULAR MOBILE COMMUNICATION SYSTEM

(71) Applicant: Samsung Electronics Co., Ltd., Suwon-si (KR)

(72) Inventors: Youngbum Kim, Seoul (KR); Joonyoung Cho, Suwon-si (KR); Hyoungju Ji, Seoul (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/895,674

(22) Filed: Jun. 8, 2020

(65) Prior Publication Data

US 2020/0304265 A1 Sep. 24, 2020

Related U.S. Application Data

(63) Continuation of application No. 15/028,616, filed as application No. PCT/KR2014/009539 on Oct. 10, 2014, now Pat. No. 10,721,043.

(30) Foreign Application Priority Data

Oct. 11, 2013 (KR) .................. 10-2013-0121346
Feb. 3, 2014 (KR) .................. 10-2014-0012251

(51) Int. Cl.
*H04L 5/00* (2006.01)
*H04W 52/14* (2009.01)
(Continued)

(52) U.S. Cl.
CPC ......... *H04L 5/0051* (2013.01); *H04B 7/2615* (2013.01); *H04L 5/0016* (2013.01);
(Continued)

(58) Field of Classification Search
CPC ....... H04L 5/0051; H04L 5/0016; H04L 5/14; H04L 5/1469; H04L 5/001; H04L 5/0048;
(Continued)

(56) References Cited

U.S. PATENT DOCUMENTS 8,792,411 B2 7/2014 Noh et al.
8,848,643 B2 9/2014 Chung et al.
(Continued)

FOREIGN PATENT DOCUMENTS

CN 102714565 A 10/2012
CN 102870476 A 1/2013
(Continued)

OTHER PUBLICATIONS

Huawei et al: "Potential solutions of TDD-FOO joint operation", 3GPP Draft; R1-132886.
(Continued)

*Primary Examiner* — Ajit Patel
*Assistant Examiner* — Wilfred Thomas
(74) *Attorney, Agent, or Firm* — Jefferson IP Law, LLP

(57) ABSTRACT

The present invention relates to a method for transmitting, by a terminal, a sounding reference signal (SRS) or a physical uplink shared channel (PUSCH) in a mobile communication system. A communication method for a terminal in a communication system which supports the combination of configuration carrier using FDD scheme and configuration carrier using TDD scheme, in accordance with an embodiment of the present invention, comprises the steps of: receiving SRS transmission setting information from a base station; receiving uplink data scheduling information from the base station; determining whether or not the simultaneous transmission of the SRS transmission and the uplink data occurs; and setting the transmission of the uplink data or the SRS so that when the simultaneous transmission of the (Continued)

SRS transmission and the uplink data occurs, the sum of the respective transmission powers of the first and second symbols in an FDD cell and the first and second symbols of a TDD cell is not greater than the maximum transmission power of the terminal, wherein the timing of the first symbol in the FDD cell corresponds to the timing of the first symbol in the TDD cell, and the timing of the second symbol in the FDD cell corresponds to the timing of the second symbol in the TDD cell. In accordance with an embodiment of the present invention, defining the SRS transmission method of the terminal in a wireless communication system causes the terminal to effectively transmit the uplink data.

4 Claims, 28 Drawing Sheets

(51) Int. Cl.
  *H04W 52/34* (2009.01)
  *H04W 72/1268* (2023.01)
  *H04B 7/26* (2006.01)
  *H04W 52/32* (2009.01)
  *H04W 52/36* (2009.01)
  *H04L 5/14* (2006.01)

(52) U.S. Cl.
  CPC ............ *H04L 5/14* (2013.01); *H04W 52/146* (2013.01); *H04W 52/325* (2013.01); *H04W 52/34* (2013.01); *H04W 52/367* (2013.01); *H04W 72/1268* (2013.01); *H04L 5/001* (2013.01); *H04L 5/0048* (2013.01); *H04L 5/1469* (2013.01)

(58) Field of Classification Search
  CPC . H04B 7/2615; H04B 7/2603; H04W 52/325; H04W 52/367; H04W 52/146; H04W 52/34; H04W 72/1268
  See application file for complete search history.

(56) References Cited

U.S. PATENT DOCUMENTS

| | | | |
|---|---|---|---|
| 9,363,769 | B2 | 6/2016 | Luo et al. |
| 2011/0058505 | A1 | 3/2011 | Pan et al. |
| 2012/0046032 | A1 | 2/2012 | Baldemair et al. |
| 2012/0257552 | A1 | 10/2012 | Chen et al. |
| 2012/0314671 | A1 | 12/2012 | Noh et al. |
| 2013/0044652 | A1 | 2/2013 | Wang et al. |
| 2013/0044653 | A1* | 2/2013 | Yang ............ H04L 5/0001 370/280 |
| 2013/0058306 | A1* | 3/2013 | Noh ............ H04L 5/0007 370/329 |
| 2013/0182618 | A1 | 7/2013 | Chen et al. |
| 2013/0195084 | A1 | 8/2013 | Chen et al. |
| 2013/0208710 | A1* | 8/2013 | Seo ............ H04W 52/30 370/336 |
| 2013/0242911 | A1* | 9/2013 | Heo ............ H04L 5/0048 370/329 |
| 2013/0250897 | A1* | 9/2013 | Dinan ............ H04L 5/0048 370/329 |
| 2013/0272230 | A1 | 10/2013 | Dinan |
| 2013/0272233 | A1* | 10/2013 | Dinan ............ H04W 72/20 370/329 |
| 2013/0279435 | A1* | 10/2013 | Dinan ............ H04L 5/0048 370/329 |
| 2013/0286907 | A1 | 10/2013 | Wei et al. |
| 2013/0322363 | A1* | 12/2013 | Chen ............ H04L 5/0053 370/329 |
| 2013/0329675 | A1* | 12/2013 | Dinan ............ H04W 52/50 370/329 |
| 2014/0056271 | A1 | 2/2014 | Ahn et al. |
| 2014/0177527 | A1 | 6/2014 | Lee et al. |
| 2014/0204922 | A1 | 7/2014 | Kim et al. |
| 2014/0293947 | A1* | 10/2014 | Nishikawa ........ H04W 72/1257 370/329 |
| 2014/0376424 | A1* | 12/2014 | Seo ............ H04L 1/1861 370/280 |
| 2015/0031410 | A1* | 1/2015 | Lim ............ H04W 52/244 455/522 |
| 2015/0043392 | A1* | 2/2015 | Susitaival ......... H04W 72/0446 370/280 |
| 2015/0200762 | A1* | 7/2015 | Kim ............ H04L 1/0027 370/329 |
| 2015/0223231 | A1* | 8/2015 | Noh ............ H04W 48/00 370/329 |
| 2015/0245347 | A1* | 8/2015 | Yi ............ H04W 74/0833 370/280 |
| 2015/0327263 | A1* | 11/2015 | Chen ............ H04W 16/14 370/280 |
| 2015/0373737 | A1* | 12/2015 | Park ............ H04L 1/16 370/329 |
| 2016/0233996 | A1 | 8/2016 | Heo et al. |

FOREIGN PATENT DOCUMENTS

| | | |
|---|---|---|
| CN | 103109489 A | 5/2013 |
| EP | 3042529 A1 | 7/2016 |
| JP | 2013-520067 A | 5/2013 |
| WO | 2011/014019 A2 | 2/2011 |
| WO | 2012-051756 A1 | 4/2012 |
| WO | 2013/012281 A2 | 1/2013 |
| WO | 2013/112320 A1 | 8/2013 |
| WO | 2015/034302 A1 | 3/2015 |

OTHER PUBLICATIONS

ZTE, Issues for TDD-FOO CA[online], 3GPP TSG-RAN WG1#74b R1-134316.
Samsung, SRS transmission for TDD-FOO CA[online], 3GPPTSG-RAN WG1#76 R1-140362.
Extended European Search Report dated Sep. 26, 2018, issued in a counterpart European application No. 18185227.8-1219.
Japanese Office Action dated Oct. 15, 2018, issued in a counterpart Japanese application No. 2016-521934.
CATT et al: "Sounding reference signals in UpPTS for TDD", 3GPP Draft; R1-081327, 3rd Generation Partnership Project {3GPP), Mobile Competence Centre, XP050109753; Shenzhen, China; Mar. 31, 2008.
ZTE: "Issues for TDD-FDD CA", 3GPP Draft; R1-134851, 3rd Generation Partnership Project {3GPP), Mobile Competence Centre, XP050750353; Guangzhou, China; Oct. 7, 2013.
CATT, 'Remaining Details of enhanced UL power control', R1-133010, 3GPP TSG RAN WG1 Meeting #74, Barcelona, Spain, Aug. 19-23, 2013 (http://www.3gpp.org/ftp/tsg_ran/WG1_RL_1/TSGR1_74/Docs/R1-133010.zip), Aug. 19-23, 2013.
CATT, Deployment scenarios ofl TE FDD-TDD joint operation-, R1-133021, 3GPP TSG RAN WG1 Meeting #74, Barcelona, Spain, Aug. 19-23, 2013(http://www.3gpp.org/ftp/tsg_ran/WG1_RL_1/TSGR1_74/Docs/R1-133021 .zip), Aug. 19-23, 2013.
Itri, 'UL power control enhancement and CSI enhancement for TDD eIMTA', R1-133316, 3GPP TSG RAN WG1 Meeting #74, Barcelona, Spain, Aug. 19-23, 2013 http://www.3gpp.org/ftp/tsg_ran/WG1_RL 1/TSGR1_74/DocsR1-133316.zip), Aug. 19-23, 2013.
LG Electronics, CA-based aspects for FDDTDD joint operation-, R1-133372, 3GPP TSG RAN WG1 Meeting #74 Barcelona, Spain, Aug. 19-23, 2013 (http://www.3gpp.org/ftp/tsg_ran/WG1_RL 1/TSGR1_74/Docs/R1-133372.zip), Aug. 19-23, 2013.
Chinese Office Action dated Dec. 27, 2021, issued in Chinese Application No. 201910507114.8.

* cited by examiner

METHOD AND APPARATUS FOR TRANSMITTING SRS IN WIRELESS CELLULAR MOBILE COMMUNICATION SYSTEM

CROSS-REFERENCE TO RELATED APPLICATION(S)

This application is a continuation application of prior application Ser. No. 15/028,616, filed on Apr. 11, 2016, is a U.S. National Stage application under 35 U.S.C. § 371 of an International application number PCT/KR2014/009539, filed on Oct. 10, 2014, which is based on and claimed priority of a Korean patent application number 10-2013-0121346, filed on Oct. 11, 2013, and Korean patent application number 10-2014-0012251, filed on Feb. 3, 2014, in the Korean Intellectual Property Office, the disclosure of each of which is incorporated by reference herein in its entirety.

TECHNICAL FIELD

The present invention relates to cellular wireless communication systems, and more particularly, to a method for a terminal to transmit Sounding Reference Signal (SRS) to a base station in a communication system configured to support the carrier aggregation of a component carrier using a Frequency Division Duplex (FDD) scheme and a component carrier using a Time Division Duplex (TDD) scheme.

BACKGROUND ART

Wireless communication systems that were providing voice-based services have evolved to broadband wireless communication systems that are capable of providing packet data services based on high quality and high speed, such as: Long Term Evolution (LTE), High Speed Packet Access (HSPA) defined in 3rd Generation Partnership Project (3GPP); Ultra Mobile Broadband (UMB), High Rate Packet Data (HRPD) defined in 3rd Generation Partnership Project 2 (3GPP2); the communication standard IEEE 802.16e; etc.

The LTE system, as a typical example of the broadband wireless communication systems, employs Orthogonal Frequency Division Multiplexing (OFDM) in the downlink and Single Carrier-Frequency Division Multiple Access (SC-FDMA) in the uplink. The Multiple Access performs allocation and management of time-frequency resources to carry data and control information according to users, so as not to overlap with each other, i.e., so as to achieve orthogonality between them, thereby distinguishing data or control information between respective users.

FIG. 1 is a diagram showing the basic structure of a radio resource area on the time-frequency domain, transmitting data or control information through an uplink of an LTE system.

In LTE systems, uplink (UL) refers to a radio link through which UE transmits data or control signals to evolved Node B (eNB) (base station) and downlink (DL) refers to a radio link through which eNB transmits data or controls signals to UE.

As shown in FIG. 1, the horizontal and vertical axes represent the time and frequency domains, respectively. The minimum unit of transmission on the time domain is an SC-FDMA symbol. $N_{symb}$ SC-FDMA symbols (N represents the number of symbols), indicated by the reference number 102, form one slot 106. Two slots 106 form one subframe 105. 10 subframes 105 form one radio frame 107. The slot has a length of 0.5 ms. The subframe has a length of 1.0 ms. The radio frame has a length of 10 ms. The minimum unit of transmission on the frequency domain is a subcarrier.

The basic unit of resource on the time-frequency domain is a Resource Element (RE) 112 and is represented by an SC-FDMA symbol index and a subcarrier index. The Resource Block (RB) 108 (or Physical Resource Block (PRB)) is defined as successive $N_{symb}$ SC-FDMA symbols 102 on the time domain and successive $N^{RB}_{SC}$ subcarriers 110 on the frequency domain. Therefore, one RB 108 includes REs of $N_{symb} \times N^{RB}_{SC}$, denoted as $N_{symb} \times N^{RB}_{SC}$ REs 112. In general, the minimum unit of data is an RB 108 and the system transmission bandwidth forms RBs of $N_{RB}$ in total, denoted as $N_{RB}$ RB 108. The overall system transmission bandwidth is subcarriers of $N_{RB} \times N^{RB}_{SC}$ in total, denoted as $N_{RB} \times N_{RB}^{SC}$ subcarriers 104. Generally, in LTE systems, $N_{symb}=7$ and $N^{RB}_{SC}=12$.

The LTE system employs a Hybrid Automatic Repeat reQuest (HARQ) scheme for retransmitting data, which has failed in decoding in the initial transmission, via the physical layer. HARQ is a scheme that allows a receiver to transmit, when not correctly decoding data from a transmitter, information (NACK) indicating the decoding failure to the transmitter so that the transmitter can perform re-transmission of the data from the physical layer. The receiver combines the data re-transmitted from the transmitter with the existing data for which decoding has failed, thereby increasing the capability of data reception. When correctly decoding data, the receiver transmits information (ACK) indicating the success of decoding to the transmitter so that the transmitter can perform transmission of new data.

In broadband wireless communication systems, one of the important factors in providing high transmission rate wireless data services is the ability to support scalable bandwidths. For example, LTE systems are capable of supporting various bandwidths, such as 20/15/10/5/3/1.4 MHz, etc. Therefore, service operators are capable of selecting a particular one of the various bandwidths and providing services via the bandwidth. There are various types of user equipment (UE) devices that are capable of supporting bandwidths from a minimum of 1.4 MHz to a maximum of 20 MHz.

FIG. 2 is a diagram showing the structure of an LTE-A system supporting carrier aggregation.

As shown in FIG. 2, eNB (base station) 202 supports the aggregation of two component carriers, CC #1 and CC #2. CC #1 has a frequency f1 and CC #2 has a frequency f2 that differs from f1. CC #1 and CC #2 are included in the same eNB 202. The eNB 202 provides coverage 204 and 206 corresponding to the component carrier CC #1 and CC #2, respectively. The LTE-A system capable of supporting carrier aggregation performs transmission of data and transmission of control information related to the transmission of data, according to component carriers, respectively. The configuration shown in FIG. 2 may also be applied to the aggregation of uplink carriers in the same way as the aggregation of downlink carriers.

The carrier aggregation system divides component carriers into Primary Cell (Pcell) and Secondary Cell (Scell) and manages them. Pcell refers to a cell that provides the basic radio resources to UE and serves as a standard cell allowing UE to perform operations such as the initial access, a handover, etc. Pcell includes a downlink primary frequency (or Primary Component Carrier (PCC)) and an uplink primary frequency. Scell refers to a cell that provides additional radio resources to UE along with Pcell. Scell includes a downlink secondary frequency (or Secondary Component Carrier (SCC)) and an uplink secondary frequency. In the present disclosure, unless otherwise indicated, the terms 'cell' and 'component carrier' will be used interchangeably with each other.

The Frequency Division Duplex (FDD) scheme employs different frequencies for downlink and uplink. In contrast, the Time Division Duplex (TDD) scheme employs the same frequency for downlink and uplink but performs transmission and reception of uplink/downlink signals at different times. The LTE TDD scheme transmits uplink or downlink signals at different times according to subframes. Therefore, on the time domain, according to traffic load of uplink and downlink, the LTE TDD is capable of: dividing subframes to uplink/downlink equally and managing them; or assigning more subframes to either downlink or uplink and managing them.

TABLE 1

| Uplink-downlink configura- | Subframe number | | | | | | | | | |
|---|---|---|---|---|---|---|---|---|---|---|
| tion | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows the TDD uplink-downlink configuration defined as in LTE. In table 1, 'D' denotes a subframe configured for downlink transmission, 'U' denotes a subframe configured for uplink transmission, and 'S' represents a Special subframe including a Downlink Pilot Time Slot (DwPTS), a Guard Period (GP), and an Uplink Pilot Time Slot (UpPTS).

FIG. 3 is a diagram showing the structure of a special subframe for an LTE TDD system.

Referring to FIG. 3, DwPTS 301 is used to transmit control information via downlink like a general subframe. When DwPTS 301 has a sufficient length according to configuration states of a special subframe, it can be used to transmit downlink data. GP 302 is a section for accepting the transition of transmission signals from a downlink to an uplink, and its length is determined according to the network settings, etc. UpPTS 303 contains one or two SC-FDMA symbols and is used to transmit Sounding Reference Signal (SRS) of UE which eNB needs to estimate an uplink channel state or a random access preamble of UE to perform random access.

The special subframe has a length of 1 ms like the general subframe. According to the settings of eNB, DwPTS 301 includes 3 to 12 OFDM symbols and UpPTS 303 includes 1 or 2 SC-FDMA symbols. GP 302 has a time interval obtained by subtracting the length of DwPTS 301 and UpPTS 303 from the overall length of the special subframe, 1 ms.

As described in table 1, the special subframe may be set to subframe #1 or subframe #6 according to the TDD uplink-downlink configuration.

For example, for TDD uplink-downlink configuration #6, subframe #0, #5, and #9 may transmit downlink data and control information, and subframe #2, #3, #4, #7, and #8 may transmit uplink data and control information. Subframe #1 and #6 corresponding to the special subframe may transmit downlink control information and further downlink data according to conditions. Sounding Reference Signal (SRS) or RACH may be transmitted via the uplink.

eNB estimates an uplink channel state from an SRS transmitted from UE. In general, an SRS may be located in the last SC-FDMA symbol of a subframe. In an LTE system using a TDD scheme, the UpPTS section of the special subframe may transmit SRS over a maximum of two SC-FDMA symbols. eNB may determine a subframe, available to transmit an SRS, and an SC-FDMA symbol in the UpPTS, available to transmit an SRS, and inform UE of the settings via signaling.

A conventional LTE-A system configured to support carrier aggregation has a limitation to apply the same duplex scheme to individual component carriers. That is, it aggregates component carriers using the FDD scheme to each other or component carriers using the TDD scheme to each other.

In order to perform carrier aggregation using duplex schemes that differs from each other according to component carriers, the present invention provides a method for UE to transmit an SRS via a special subframe.

DISCLOSURE OF INVENTION

Technical Problem

The present invention has been made to address the above problems and disadvantages, and to provide at least the advantages described below. Accordingly, the present invention provides a method for UE to transmit a Sounding Reference Signal (SRS) to eNB in a communication system configured to support the carrier aggregation of a component carrier using Frequency Division Duplex (FDD) scheme and a component carrier using Time Division Duplex (TDD) scheme.

This section, Technical Problem, is merely intended to provide a few aspects of the present invention. It should be understood that the features and advantages of the present invention are not limited to those in the foregoing description, and the other features and advantages not described above will become more apparent from the following description.

Solution to Problem

In accordance with an aspect of the present invention, the present invention provides a communication method of a terminal in a communication system configured to support the carrier aggregation of a component carrier using a Frequency Division Duplex (FDD) scheme and a component carrier using a Time Division Duplex (TDD) scheme. The method includes: receiving setup information regarding SRS transmission from a base station; receiving scheduling information regarding uplink data from the base station; determining whether simultaneous transmission of the SRS and the uplink data occurs; and when simultaneous transmission of the SRS and the uplink data occurs, setting the transmission of the uplink data or the SRS so that the sum of the transmission powers of the first symbol and the second symbol of an FDD cell and the first symbol and the second symbol of a TDD cell does not exceed the maximum transmission power of the terminal. The timing of the first symbol of the FDD cell corresponds to the timing of the first symbol of the TDD cell. The timing of the second symbol of the FDD cell corresponds to the timing of the second symbol of the TDD cell.

In accordance with another aspect of the present invention, the present invention provides a communication method of a base station in a communication system configured to support the carrier aggregation of a component carrier using a Frequency Division Duplex (FDD) scheme and a component carrier using a Time Division Duplex (TDD) scheme. The method includes: transmitting setup information regarding SRS transmission to a terminal; and transmitting scheduling information regarding uplink data to the terminal. The setup information regarding SRS transmission and the scheduling information regarding uplink data comprises information for setting, when simultaneous transmission of the SRS and the uplink data occurs, the transmission of the SRS or the uplink data so that the sum of the transmission powers of the first symbol and the second symbol of an FDD cell and the first symbol and the second symbol of a TDD cell does not exceed the maximum transmission power of the terminal. The timing of the first symbol of the FDD cell corresponds to the timing of the first symbol of the TDD cell. The timing of the second symbol of the FDD cell corresponds to the timing of the second symbol of the TDD cell.

In accordance with another aspect of the present invention, the present invention provides a terminal of a communication system configured to support the carrier aggregation of a component carrier using a Frequency Division Duplex (FDD) scheme and a component carrier using a Time Division Duplex (TDD) scheme. The terminal includes: a communication unit for communicating with a base station; and a controller for: receiving setup information regarding SRS transmission from the base station; receiving scheduling information regarding uplink data from the base station; determining whether simultaneous transmission of the SRS and the uplink data occurs; and setting, when simultaneous transmission of the SRS and the uplink data occurs, the transmission of the uplink data or the SRS so that the sum of the transmission powers of the first symbol and the second symbol of an FDD cell and the first symbol and the second symbol of a TDD cell does not exceed the maximum transmission power of the terminal. The timing of the first symbol of the FDD cell corresponds to the timing of the first symbol of the TDD cell. The timing of the second symbol of the FDD cell corresponds to the timing of the second symbol of the TDD cell.

In accordance with another aspect of the present invention, the present invention provides a base station of a communication system configured to support the carrier aggregation of a component carrier using a Frequency Division Duplex (FDD) scheme and a component carrier using a Time Division Duplex (TDD) scheme. The base station includes: a communication unit for communicating with a terminal; and a controller for transmitting setup information regarding SRS transmission and scheduling information regarding uplink data to the terminal. The setup information regarding SRS transmission and the scheduling information regarding uplink data comprises information for setting, when simultaneous transmission of the SRS and the uplink data occurs, the transmission of the SRS or the uplink data so that the sum of the transmission powers of the first symbol and the second symbol of an FDD cell and the first symbol and the second symbol of a TDD cell does not exceed the maximum transmission power of the terminal. The timing of the first symbol of the FDD cell corresponds to the timing of the first symbol of the TDD cell. The timing of the second symbol of the FDD cell corresponds to the timing of the second symbol of the TDD cell.

Advantageous Effects of Invention

The present invention defines an SRS transmission method of UE in a wireless communication system and enables the UE to efficiently transmit the uplink data.

It should be understood that the advantageous effects of the present invention are not limited to those in the foregoing description, and the other effects not described above will become more apparent from the following description.

BRIEF DESCRIPTION OF DRAWINGS

FIG. 23 is a block diagram showing a receiver of eNB according to an embodiment of the present invention.

MODE FOR THE INVENTION

Embodiments of the present invention are described in detail referring to the accompanying drawings. Detailed descriptions of well-known functions and structures incorporated herein may be omitted to avoid obscuring the subject matter of the invention. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term 'eNB' refers to an entity configured to assign resources to UE, and is used in the sense of at least one of the following: eNode B, eNB, Node B, Base Station (BS), radio access unit, base station controller, node on a network.

The term 'terminal' is used in the sense of: User Equipment (UE), Mobile Station (MS), cellular phone, smartphone, computer, or multimedia system capable of performing a communication function.

Embodiments of the present invention are described based on E-UTRA (or called LTE) or Advanced E-UTRA (or called LTE-A) system; however, it should be understood that the present invention can also be applied to various types of communication systems which have the technical background and channel forms similar to those of the present invention.

It will be appreciated to those skilled in the art that embodiments of the present invention can be modified without departing from the scope and sprit of the present invention and the modifications can also be applied to other types of communication systems.

In the present disclosure, a method for UE to transmit a Sounding Reference Signal (SRS) via a special subframe is defined to perform carrier aggregation using duplex schemes that differ from each other according to component carriers.

In the following description, embodiments of the present invention to resolve the conventional problems are explained in detail.

Figure 1:
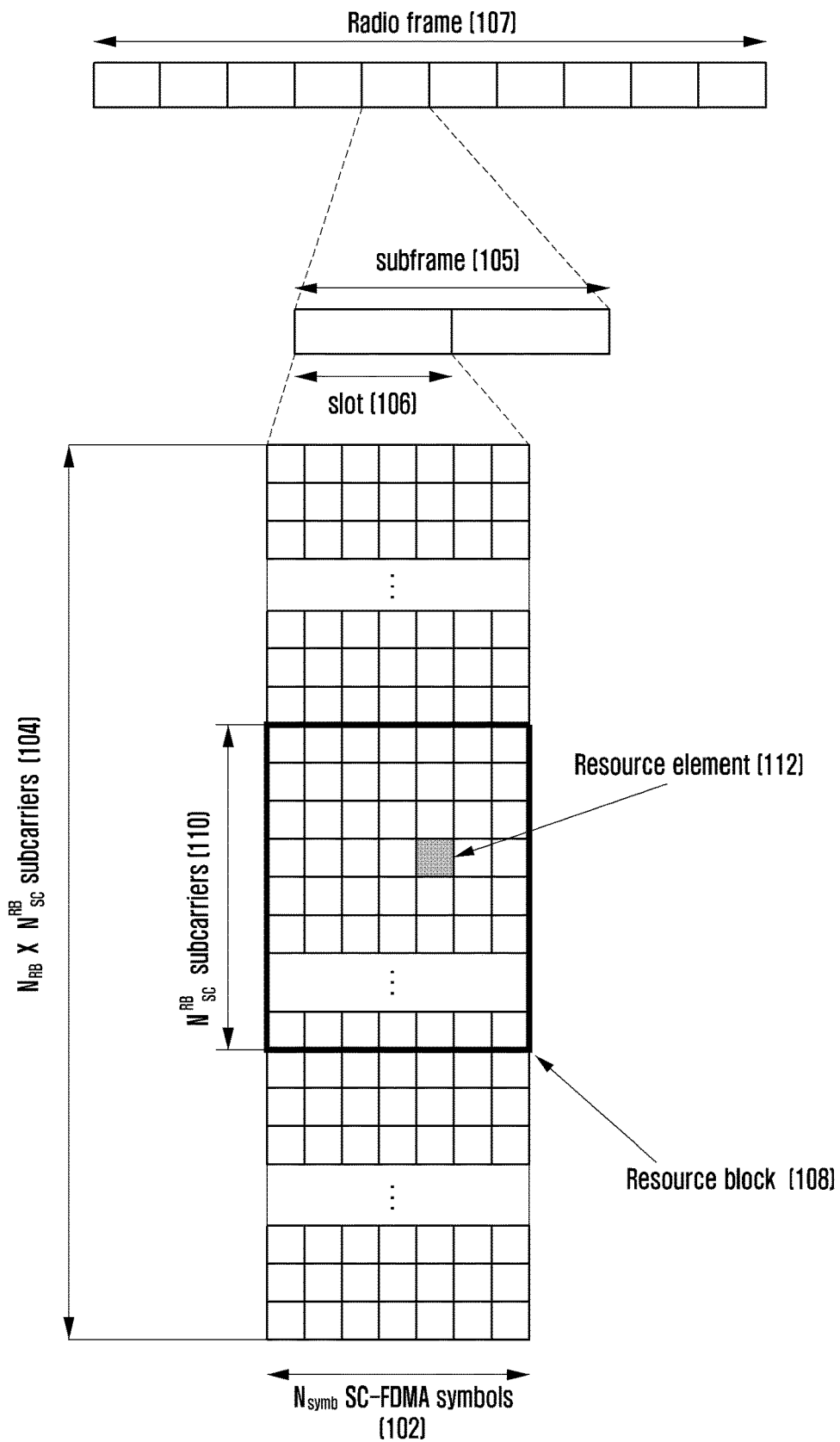
FIG. 1 is a diagram showing the basic structure of an uplink time-frequency domain of an LTE system.
Figure 2:
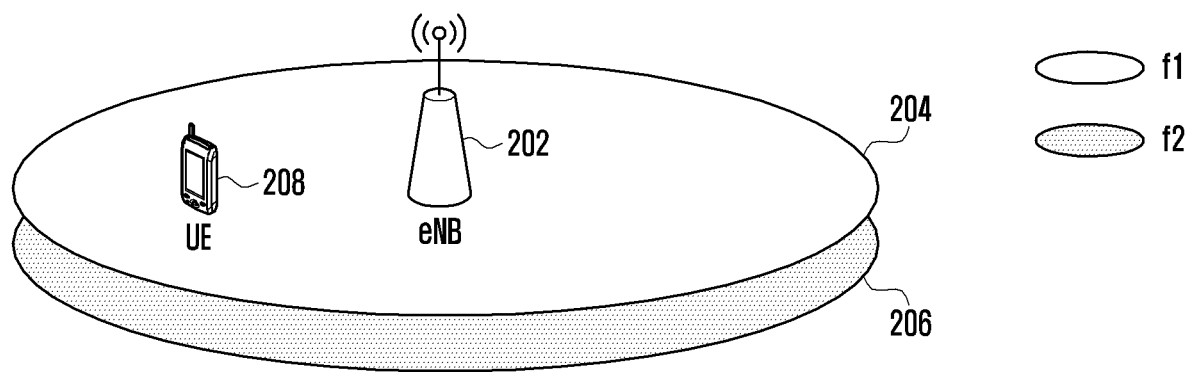
FIG. 2 is a diagram showing the structure of an LTE-A system supporting carrier aggregation.
Figure 3:
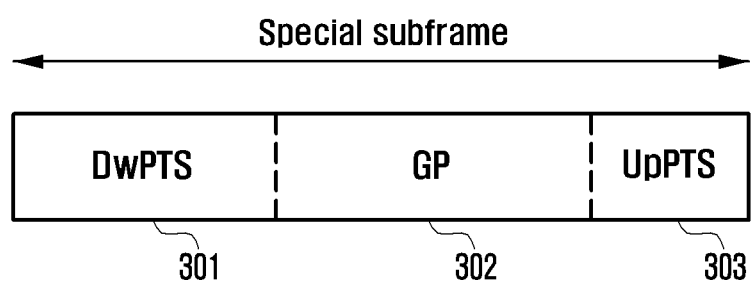
FIG. 3 is a diagram showing the structure of a special subframe for an LTE TDD system.
Figure 4:
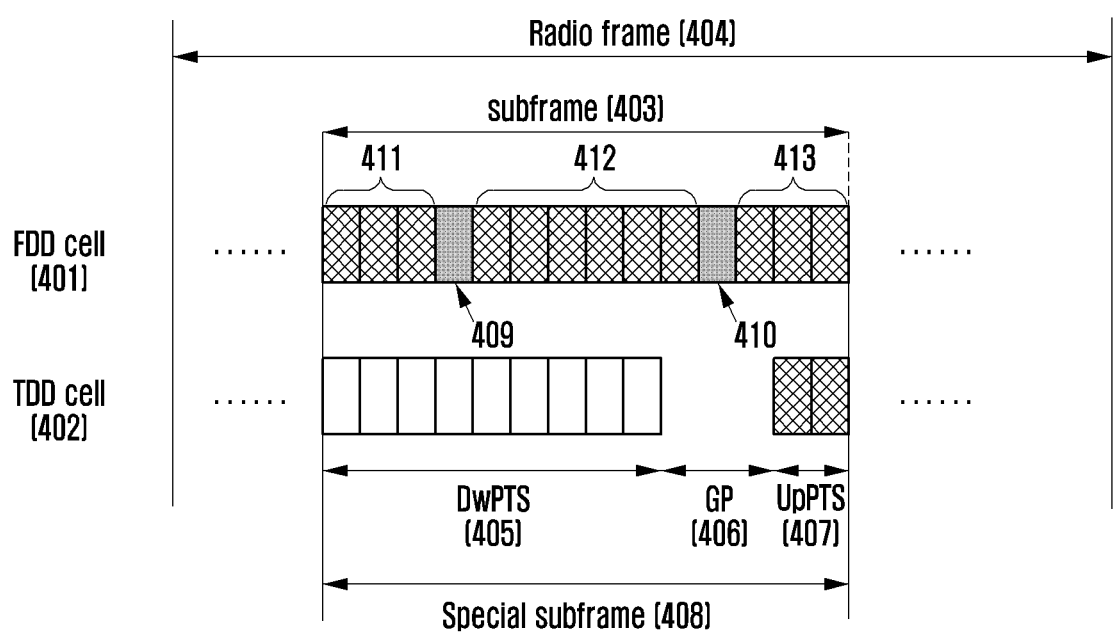
FIG. 4 is a diagram showing an example when a special subframe of a TDD cell and a subframe of an FDD cell overlap with each other in terms of time.

FIG. 4 is a diagram showing an example when a special subframe of a TDD cell and a subframe of an FDD cell overlap with each other in terms of time.

Referring to FIG. 4, in a carrier aggregation system configured to aggregate a cell (or a component carrier) using Frequency Division Duplex (FDD) scheme and a cell (or a component carrier) using Time Division Duplex (TDD) scheme and to manage the carrier aggregation, an example is shown where a special subframe 408 of a TDD cell 402 and a subframe 403 of an FDD cell 401 overlap with each other in terms of time. For the TDD cell 402, the UpPTS 407 of the special subframe 408 is set to have a length of two SC-FDMA symbols. It is assumed that UE is scheduled by eNB for uplink data transmission to perform transmission of: Physical Uplink Shared Channel (PUSCH) during the interval of the subframe 403 of the FDD cell 401; and SRS during the interval of UpPTS 407 of the special subframe 408 of the TDD cell 402.

PUSCH refers to a physical channel carrying uplink data that UE transmits to eNB. In order to estimate the PUSCH, Reference Signals (RSs) 409 and 410 are transmitted. Therefore, the PUSCH is mapped to intervals 411, 412, and 413 in the subframe 403, except for symbols where the RSs 409 and 410 and located, and is then transmitted to eNB.

eNB determines the settings, such as a condition as to whether one or two SRS symbols are transmitted during the interval of UpPTS 407, a symbol in UpPTS 407 to transmit one SRS, etc., and informs UE of the settings via higher-layer signaling.

In this case, UE needs to simultaneously transmit a PUSCH via the FDD cell 401 and an SRS via the TDD cell 402 during the interval corresponding to the UpPTS 407, and this may cause a problem that the sum of the PUSCH transmission power and the SRS transmission power exceeds the maximum allowable transmission power of UE. Therefore, there is a need to define specified transmission methods for PUSCH and SRS.

First Embodiment

In a first embodiment, specified operations are defined when UE needs to simultaneously transmit a PUSCH to an FDD cell and an SRS to a TDD cell, under the condition shown in FIG. 4. The first embodiment provides a method for UE to transmit two SRS symbols to a TDD cell during a UpPTS interval.

1) Method 1

Figure 5:
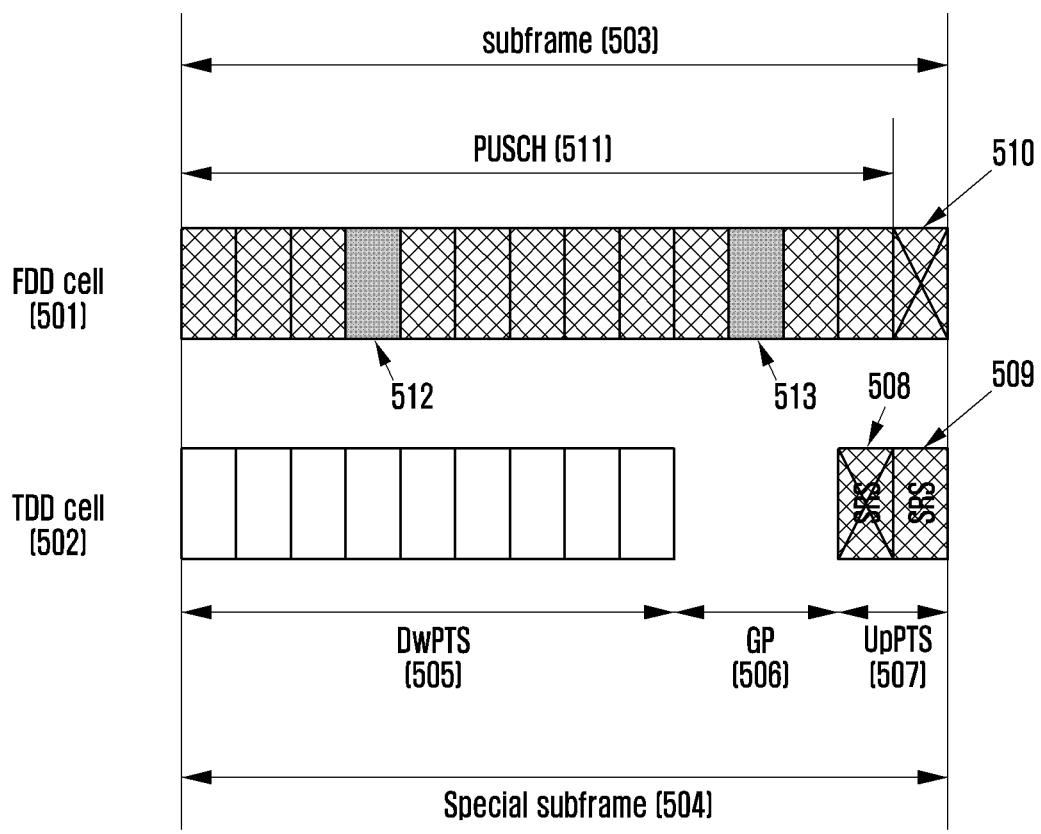
FIG. 5 is a diagram showing Method 1 according to a first embodiment of the present invention.

FIG. 5 is a diagram showing Method 1 according to a first embodiment of the present invention.

According to Method 1, UE transmits only the second one of the two SRS symbols to be transmitted via a TDD cell 502, without transmitting the first SRS symbol; and performs rate matching for a PUSCH to be transmitted via an FDD cell 501 within the last symbol interval in a subframe, thereby transmitting the PUSCH. Channel coding is generally performed to add an error correcting capability to data that UE needs to transmit. UE adjusts the size of output bit stream channel-encoded to match with the amount of resource scheduled by eNB, and maps the output bit stream to a time-frequency resource, which is called a rate-matching.

Referring to FIG. 5, Method 1 is described below. UE transmits the second SRS symbol 509, without transmitting the first SRS symbol 508, during the UpPTS interval 507 corresponding to the time interval of two SC-FDMA symbols in the special subframe 504 of the TDD cell 502. For the FDD cell 501, UE does not transmit PUSCH in the interval 510 of the last SC-FDMA symbol which overlaps with the transmission time point of the second SRS symbol 509 of the UpPTS interval 507. UE is capable of performing rate matching for channel-encoded uplink data during a time interval, except for the last SC-FDMA symbol location 510 and RS symbol locations 512 and 513, within a corresponding subframe 503 of the FDD cell 501, thereby configuring and transmitting a PUSCH (511). Therefore, from the point of view of UE transmitting uplink signals, a case is avoided where simultaneous uplink signal transmissions to the FDD cell 501 and the TDD cell 502 occur at a certain time point during the interval of the subframe 503 of the FDD cell 501 or the special subframe 504 of the TDD cell 502, thereby resolving the problem that the sum of the PUSCH transmission power and the SRS transmission power exceeds the maximum allowable transmission power of UE. Method 1 has a feature so that it does not transmit each of PUSCH and SRS, symbol by symbol, and thus does not cause excessive transmission loss in transmitting each of the PUSCH and SRS.

2) Method 2

Figure 6:
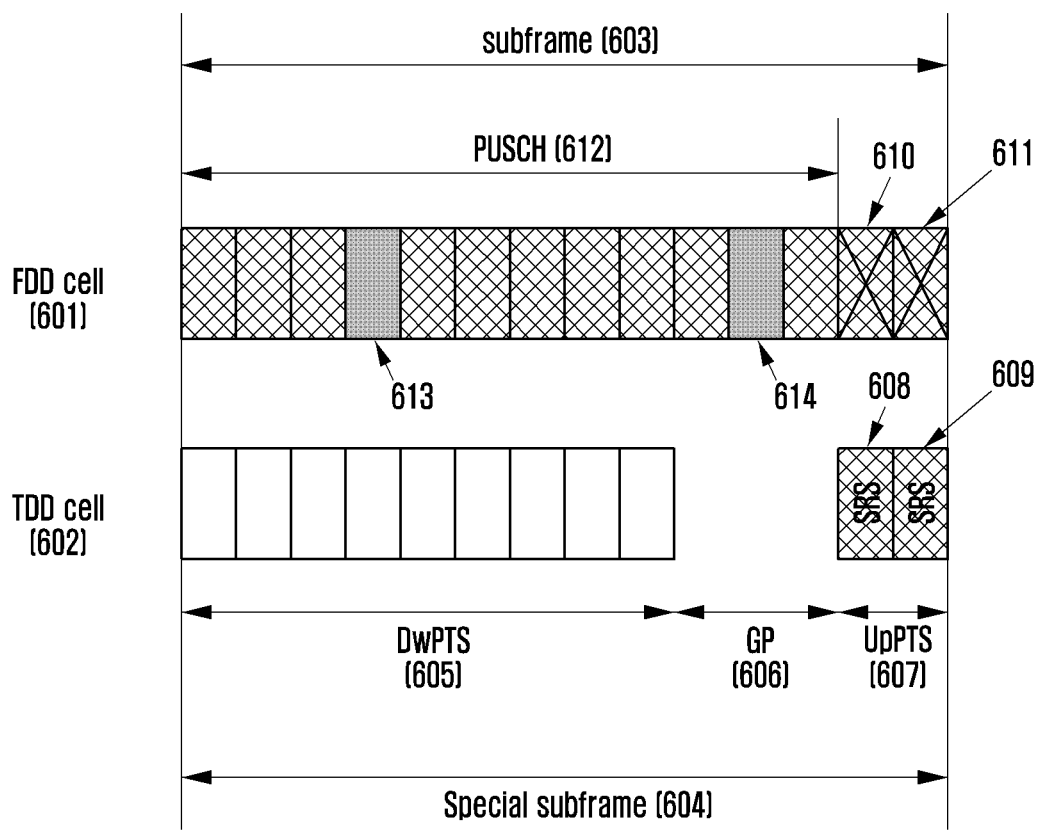
FIG. 6 is a diagram showing Method 2 according to a first embodiment of the present invention.

FIG. 6 is a diagram showing Method 2 according to a first embodiment of the present invention.

Referring to FIG. 6, Method 2 is described below. According to Method 2, UE transmits both the first SRS symbol 608 and the second SRS symbol 609 during the UpPTS interval 607 corresponding to the time interval of two SC-FDMA symbols in the special subframe 604 of the TDD cell 602. For the FDD cell 601, UE does not transmit PUSCH in intervals 610 and 611 of the last, two SC-FDMA symbols which overlap with transmission time points of the first SRS symbol 608 and the second SRS symbol 609 in the UpPTS interval 607. UE is capable of performing rate matching for channel-encoded uplink data during a time interval, except for the intervals 610 and 611 of the last two SC-FDMA symbols and RS symbol locations 613 and 614, within a corresponding subframe 603 of the FDD cell 601, thereby configuring and transmitting a PUSCH (612). Unlike the SRS, when an error occurs in PUSCH transmitted via a current subframe, the error can be corrected by HARQ and re-transmission. As described above, Method 2 has a feature so that it prioritizes the transmission of SRS whenever possible.

3) Method 3

Figure 7:
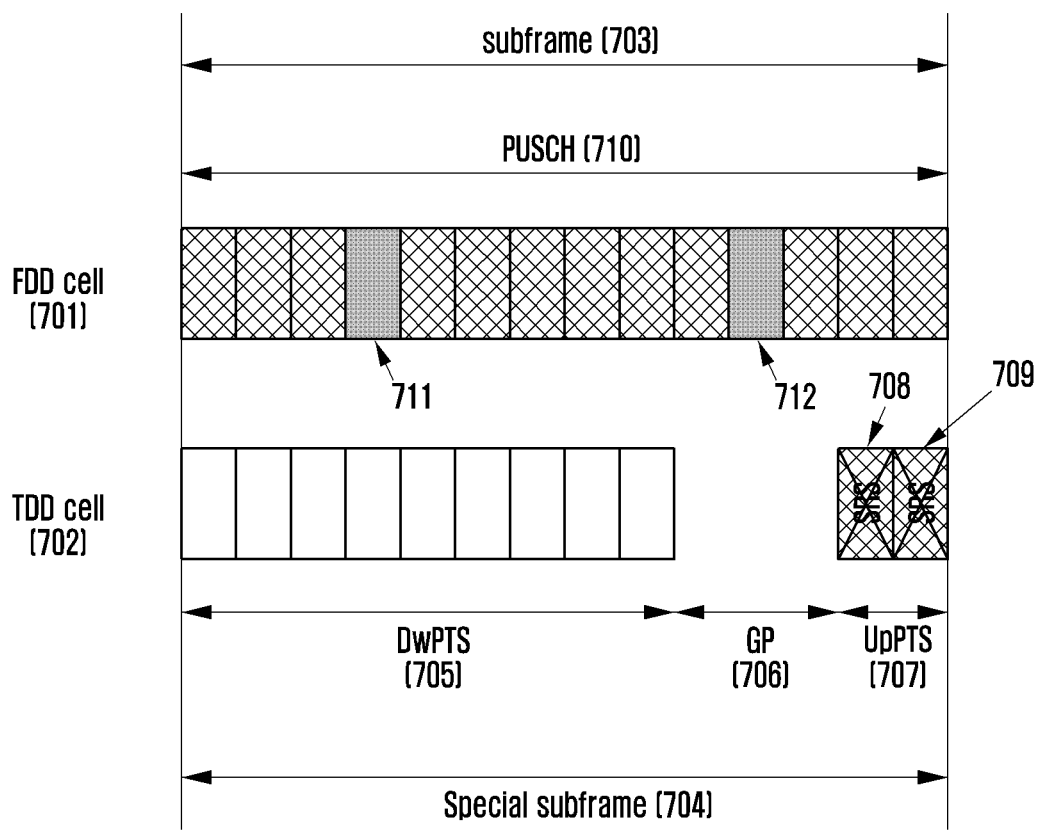
FIG. 7 is a diagram showing Method 3 according to a first embodiment of the present invention.

FIG. 7 is a diagram showing Method 3 according to a first embodiment of the present invention.

Referring to FIG. 7, Method 3 is described below. According to Method 3, UE does not transmit the first SRS symbol 708 and the second SRS symbol 709 during the UpPTS interval 707 corresponding to the time interval of two SC-FDMA symbols in the special subframe 704 of the TDD cell 702. For the FDD cell 701, UE is capable of performing rate matching for channel-encoded uplink data over SC-FDMA symbols, except for the RS symbol locations 711 and 712, within a subframe 703, thereby configuring and transmitting a PUSCH (710). Method 3 has a feature so that it prioritizes the transmission of PUSCH over the transmission of SRS.

4) Method 4

Figure 8:
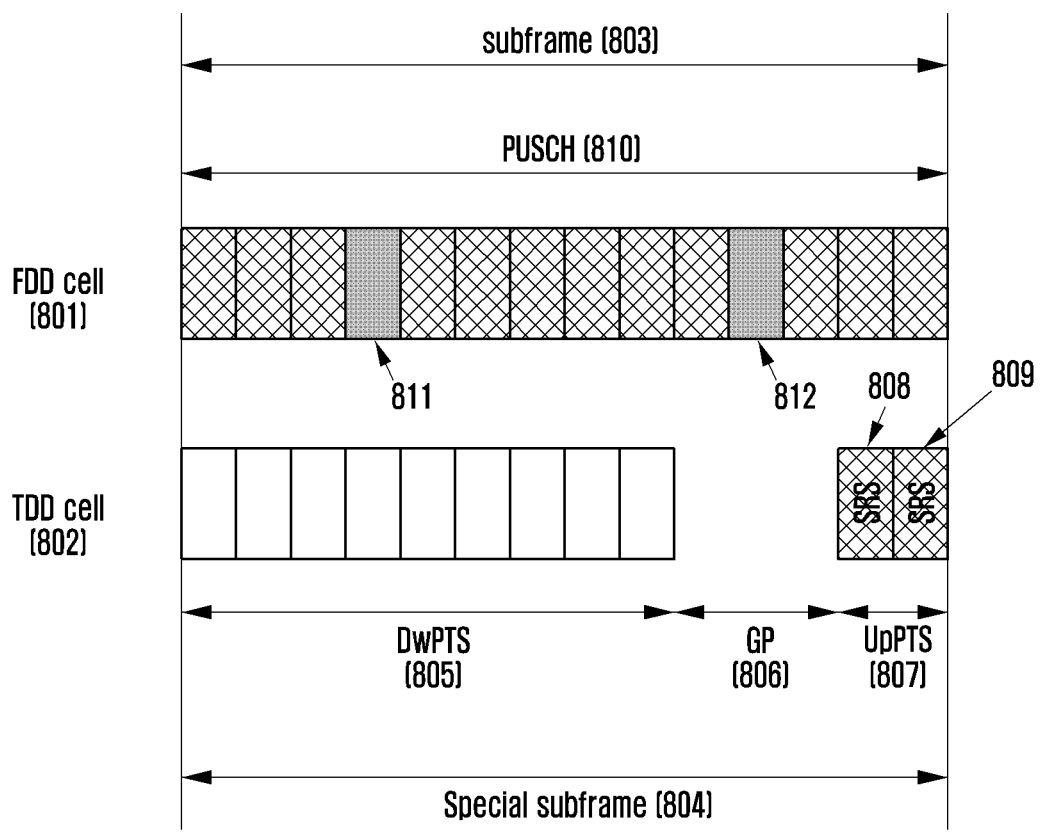
FIG. 8 is a diagram showing Method 4 according to a first embodiment of the present invention.

FIG. 8 is a diagram showing Method 4 according to a first embodiment of the present invention.

Referring to FIG. 8, Method 4 is described below. According to Method 4, UE transmits both the first SRS symbol 808 and the second SRS symbol 809 during the UpPTS interval 807 corresponding to the time interval of two SC-FDMA symbols in the special subframe 804 of the TDD cell 802. For the FDD cell 801, UE performs rate matching for channel-encoded uplink data over SC-FDMA symbols, except for the RS symbol locations 811 and 812, within a subframe 803, thereby configuring and transmitting a PUSCH (810).

In this case, the PUSCH transmission power or the SRS transmission power is adjusted so that the sum of the PUSCH transmission power and the SRS transmission power can be maintained within the maximum allowable transmission power of UE, during the UpPTS interval 807 where uplink signals are simultaneously transmitted to the FDD cell 801 and TDD cell 802. For example, when the PUSCH transmission has priority, the SRS transmission power is adjusted to a value less than a required level of transmission power, so that the sum of the PUSCH transmission power and the SRS transmission power is main- tained within the maximum allowable transmission power of UE, during UpPTS interval 807. Alternatively, when the SRS transmission has priority, the PUSCH transmission power is adjusted to a value less than a required level of transmission power, so that the sum of the PUSCH trans- mission power and the SRS transmission power is main- tained within the maximum allowable transmission power of UE, during UpPTS interval 807. Alternatively, each of the SRS transmission power and the PUSCH transmission power is adjusted to a value less than a required level of transmission power, so that the sum of the PUSCH trans- mission power and the SRS transmission power is main- tained within the maximum allowable transmission power of UE, during UpPTS interval 807.

In general, the PUSCH transmission power is constantly maintained within one subframe transmitting PUSCH, thereby simplifying operations of the receiver. Therefore, according to an embodiment, when PUSCH transmission power is adjusted during the SC-FDMA symbol interval overlapping with the UpPTS interval 807 and PUSCH is transmitted, the value of adjusted PUSCH transmission power can also be applied to the interval of the remaining symbols transmitting PUSCH in the subframe as well as the SC-FDMA symbol interval overlapping with the UpPTS interval 807.

When transmission power of UE is adjusted, eNB is capable of: determining a condition as to whether it priori- tizes the SRS signal transmission or the PUSCH signal transmission or equalizes the SRS signal transmission and the PUSCH signal transmission regardless of the priority; and then informing the UE of the condition via higher-layer signaling.

In addition, one of the Method 1 to Method 4 is pre- defined as a method to be applied or eNB informs UE of the pre-defined method via higher-layer signaling. Alternatively, in another embodiment, one of the Method 1 to Method 4 may be defined as a method to be applied according to a condition as to whether the PUSCH transmission is initial transmission or re-transmission. For example, when the PUSCH transmission is initial transmission, Method 3 where the PUSCH transmission has priority is applied. When the PUSCH transmission is re-transmission, Method 2 where the SRS transmission has priority is applied. When the PUSCH transmission is re-transmission, the receiver of the eNB has a higher probability of successfully decoding PUSCH via an HARQ process combining the initially transmitted PUSCH with the re-transmitted PUSCH. There- fore, the SRS transmission has a relatively high priority in re-transmitting PUSCH.

Second Embodiment

In a second embodiment, specified operations are defined when UE needs to simultaneously transmit a PUSCH to an FDD cell and an SRS to a TDD cell, under the condition shown in FIG. 4. The second embodiment provides a method for UE to transmit two SRS symbols to a TDD cell and a PUSCH and an SRS to an FDD cell, during a UpPTS interval.

1) Method 1

Figure 9:
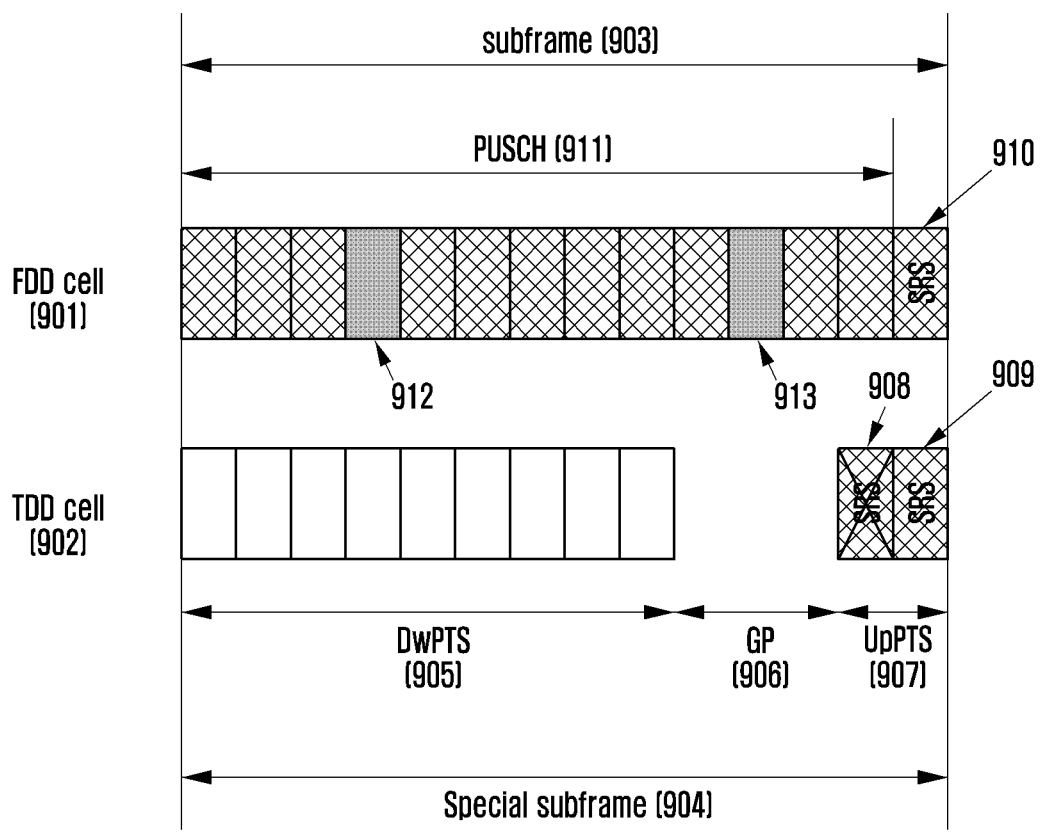
FIG. 9 is a diagram showing Method 1 according to a second embodiment of the present invention.

FIG. 9 is a diagram showing Method 1 according to a second embodiment of the present invention.

Referring to FIG. 9, Method 1 is described below. Accord- ing to Method 1, of the two SRS symbols to be transmitted via a TDD cell 902, UE transmits only the second SRS symbol 909, without transmitting the first SRS symbol 908. In addition, Method 1 maps an SRS to be transmitted via an FDD cell 901 to the last symbol in a subframe 903 and transmits the result to the FDD cell 901 (910). Additionally, Method 1 performs rate matching for data to be transmitted to the FDD cell 901 during a time interval, except for RS symbol locations 912 and 913 and the last symbol location 910, transmitting an SRS in the subframe 903, thereby configuring and transmitting a PUSCH (911).

In this case, UE is capable of adjusting transmission power of SRS 910 transmitted to an FDD cell 901 and transmission power of SRS 909 transmitted to a TDD cell 902, respectively, so that the sum of the transmission power of SRS 910 and the transmission power of SRS 909 does not exceed the maximum allowable transmission power of UE. The quantity of SRS transmission power to be adjusted may be determined according to the priority. For example, when SRS symbols 910 and 909, transmitted to an FDD cell 901 and a TDD cell 902, respectively, have the same degree of importance, the transmission power of SRS 910 transmitted to an FDD cell 901 and the transmission power of SRS 909 transmitted to a TDD cell 902 is reduced by the same proportion, so that the sum of the adjusted transmission power of SRS 910 and the adjusted transmission power of SRS 909 does not exceed the maximum allowable transmission power of UE. When SRS 910 transmitted to an FDD cell 901 has priority, the transmission power of SRS 909 transmitted to a TDD cell 902 is reduced by a relatively larger proportion and the transmission power of SRS 910 transmitted to an FDD cell 901 is reduced by a relatively smaller proportion or not reduced, so that the sum of the adjusted transmission power of SRS 910 and the adjusted transmission power of SRS 909 does not exceed the maximum allowable transmission power of UE. According to embodiments, eNB may determine the priority between SRSs to be transmitted and inform UE of the determined priority via higher-layer signaling.

2) Method 2

Figure 10:
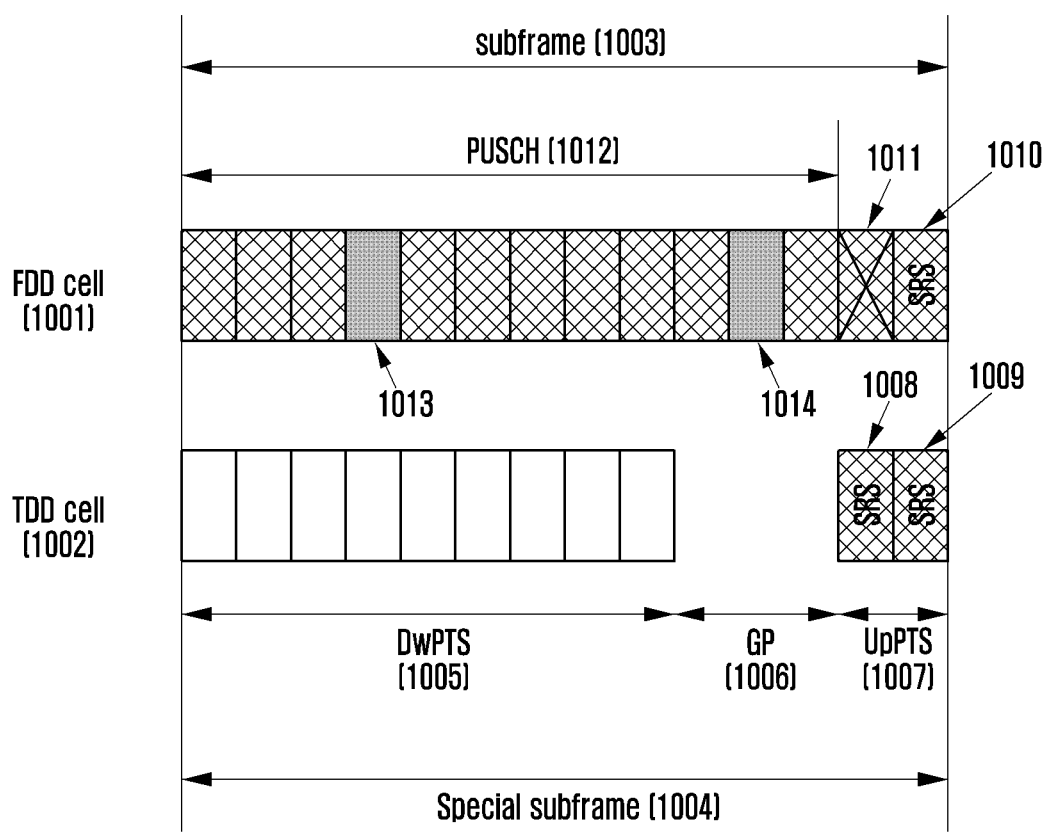
FIG. 10 is a diagram showing Method 2 according to a second embodiment of the present invention.

FIG. 10 is a diagram showing Method 2 according to a second embodiment of the present invention.

Referring to FIG. 10, Method 2 is described below. According to Method 2, UE transmits both the first SRS symbol 1008 and the second SRS symbol 1009 during the UpPTS interval 1007 corresponding to the time interval of two SC-FDMA symbols in the special subframe 1004 of the TDD cell 1002.

SRS to be transmitted to an FDD cell 1001 is mapped to the last symbol 1001 in a subframe 1003 and then transmitted thereto. Like Method 1, UE is capable of adjusting transmission power of SRS 1010 transmitted to an FDD cell 1001 and transmission power of SRS 1009 transmitted to a TDD cell 1002, respectively, according to the priority between SRSs to be transmitted, so that the sum of the transmission power of SRS 1010 and the transmission power of SRS 1009 does not exceed the maximum allowable transmission power of UE.

For uplink data to be transmitted to an FDD cell 1001, UE performs rate matching for channel-encoded uplink data over intervals except for RS symbol locations 1013 and 1014 and an interval overlapping with the UpPTS interval 1007 within a subframe 1003, thereby configuring and transmitting a PUSCH (1012). Therefore, uplink signal transmission is not performed for the last second symbol 1011 of the subframe 1003.

Method 2 has a feature so that it transmits two SRS symbols to a TDD cell 1002 whenever possible, despite PUSCH transmission loss which may be caused due to the decrease in the number of symbols configuring a PUSCH transmitted to the FDD cell 1001, thereby allowing eNB to relatively precisely measure a channel state of the TDD cell 1002.

3) Method 3

Figure 11:
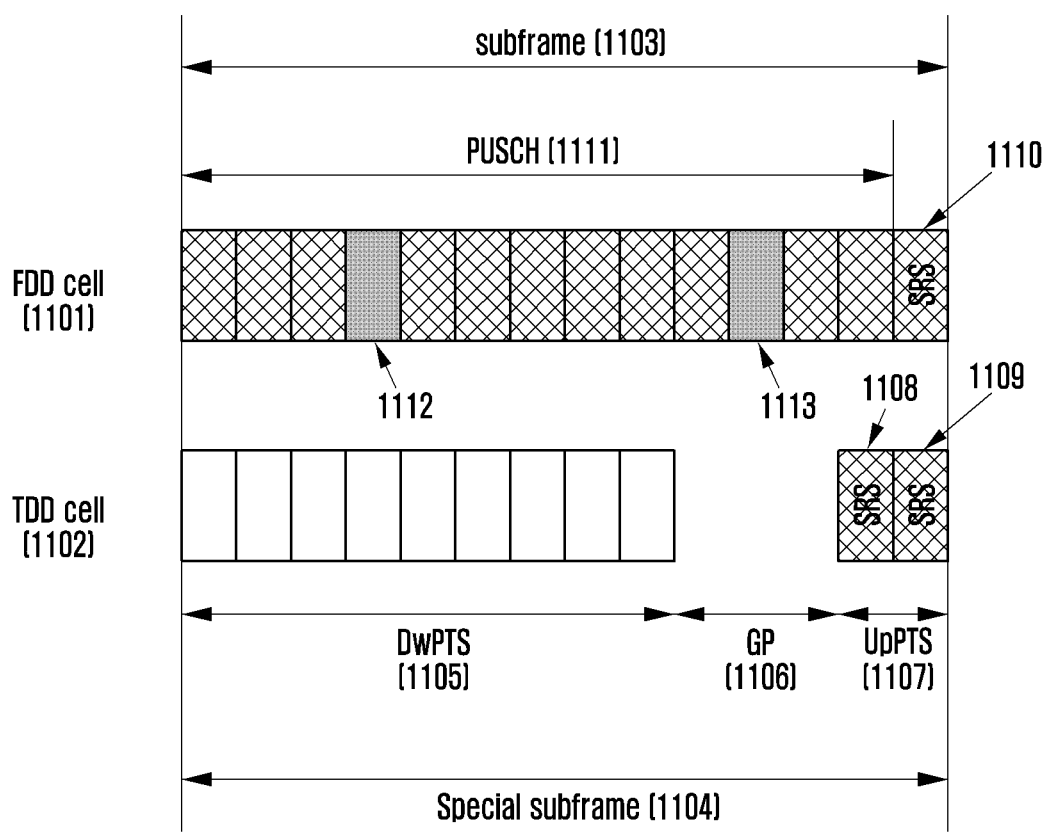
FIG. 11 is a diagram showing Method 3 according to a second embodiment of the present invention.

FIG. 11 is a diagram showing Method 3 according to a second embodiment of the present invention.

Referring to FIG. 11, Method 3 is described below. According to Method 3, UE transmits both the first SRS symbol 1108 and the second SRS symbol 1109 during the UpPTS interval 1107 corresponding to the time interval of two SC-FDMA symbols in the special subframe 1104 of the TDD cell 1102. In addition, for an FDD cell 1101, Method 3 maps an SRS to the last symbol 1110 in a subframe 1103 and transmits the result. Additionally, Method 3 performs rate matching for channel-encoded uplink data during a time interval, except for RS symbol locations 1112 and 1113 and the symbol 1110 to which the SRS is mapped, in the subframe 1103, thereby configuring and transmitting a PUSCH (1111).

In this case, UE is capable of adjusting transmission power of an uplink signal transmitted to an FDD cell 1101 and transmission power of an uplink signal transmitted to a TDD cell 1102, respectively, so that the sum of the transmission power of an uplink signal transmitted to an FDD cell 1101 and transmission power of an uplink signal transmitted to a TDD cell 1102 does not exceed the maximum allowable transmission power of UE, during the UpPTS interval 1107 where the uplink signal transmissions to the FDD cell 1101 and the TDD cell 1102 are simultaneously performed. In addition, like Method 1, Method 3 defines the priority according to cells or types of uplink transmission signal, and adjusts the transmission power based on the defined priority.

In general, the PUSCH transmission power is constantly maintained within one subframe transmitting PUSCH, thereby simplifying operations of the receiver. Therefore, according to an embodiment, when PUSCH is transmitted with adjusted PUSCH transmission power during the SC-FDMA symbol interval overlapping with the UpPTS interval 1107, the value of adjusted PUSCH transmission power can also be applied to the interval of the remaining symbols transmitting PUSCH in the subframe as well as the SC-FDMA symbol interval overlapping with the UpPTS interval 1107.

Like the first embodiment, the second embodiment is implemented in such a way that one of the Method 1 to Method 3 is pre-defined as a method to be applied or eNB informs UE of the pre-defined method via higher-layer signaling. Alternatively, in another embodiment, one of the Method 1 to Method 3 may be defined as a method to be applied according to a condition as to whether the PUSCH transmission is initial transmission or re-transmission. For example, when the PUSCH transmission is initial transmission, Method 1 where the PUSCH transmission has priority is applied. When the PUSCH transmission is re-transmission, Method 2 where the SRS transmission has priority is applied. When the PUSCH transmission is re-transmission, the receiver of the eNB has a higher probability of successfully decoding PUSCH via an HARQ process combining the initially transmitted PUSCH with the re-transmitted PUSCH. Therefore, the SRS transmission has a relatively high priority in re-transmitting PUSCH.

The first and second embodiments may also be modified in such a way to define operations regarding a case that UE transmits a PUSCH to an FDD cell and a random access preamble to a TDD cell during the interval of UpPTS 2 symbol. In general, PUSCH is processed for its additional error correction by the HARQ process. When the transmission time points of the PUSCH and the random access preamble overlap with each other, the modifications may prioritize the transmission of a random access preamble. Since the length of a random access preamble in a UpPTS interval is fixed to an interval of 2 symbols, the modifications may also employ Method 2 and Method 4 of the first embodiment and Method 2 and Method 3 of the second embodiment, which can transmit 2 symbol unlink signals in UpPTS. In this case, its detailed description can be substituted by those of the first and second embodiments where the SRS is only replaced with a random access preamble. In order to prevent the reception performance degradation of a random access preamble, the transmission power of a random access preamble may be maintained to a constant value during the UpPTS interval.

Third Embodiment

In a third embodiment, specified operations are defined when UE needs to simultaneously transmit a PUSCH to an FDD cell and an SRS to a TDD cell, under the condition shown in FIG. 4. The third embodiment provides a method for UE to transmit an SRS symbol at the first symbol location to a TDD cell during a UpPTS interval.

1) Method 1

Figure 12:
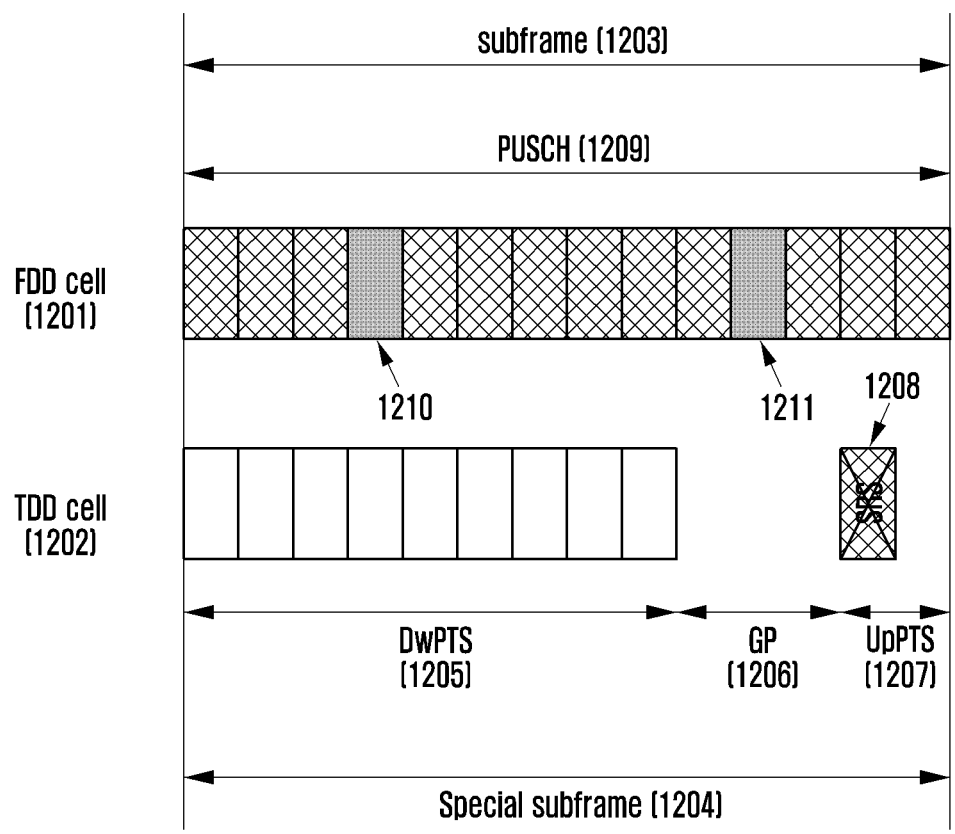
FIG. 12 is a diagram showing Method 1 according to a third embodiment of the present invention.

FIG. 12 is a diagram showing Method 1 according to a third embodiment of the present invention.

According to Method 1, UE transmits PUSCH to be transmitted to an FDD cell 1201 thereto by using the entire symbol in a subframe, without transmitting an SRS symbol to be transmitted to a TDD cell 1202. Referring to FIG. 12, Method 1 is described below. UE does not transmit an SRS symbol 1208 required to be transmitted, in a special subframe 1204 of a TDD cell 1202. For the FDD cell 1201, UE performs rate matching for channel-encoded uplink data over an interval of symbols that excludes RS symbol locations 1210 and 1211 from the entire symbol in the subframe 1203, including an interval overlapping with the UpPTS interval 1207, thereby configuring and transmitting a PUSCH (1209). Therefore, from the point of view of UE transmitting uplink signals, a case is avoided where simultaneous uplink signal transmissions to the FDD cell 1201 and the TDD cell 1202 occur at a certain time point during the interval of the subframe 1203 or the special subframe 1204, thereby resolving the problem that the sum of the PUSCH transmission power and the SRS transmission power exceeds the maximum allowable transmission power of UE. Method 1 has a feature so that it does not transmit SRS of a TDD cell 1202 and thus prioritizes the transmission of PUSCH.

2) Method 2

Figure 13:
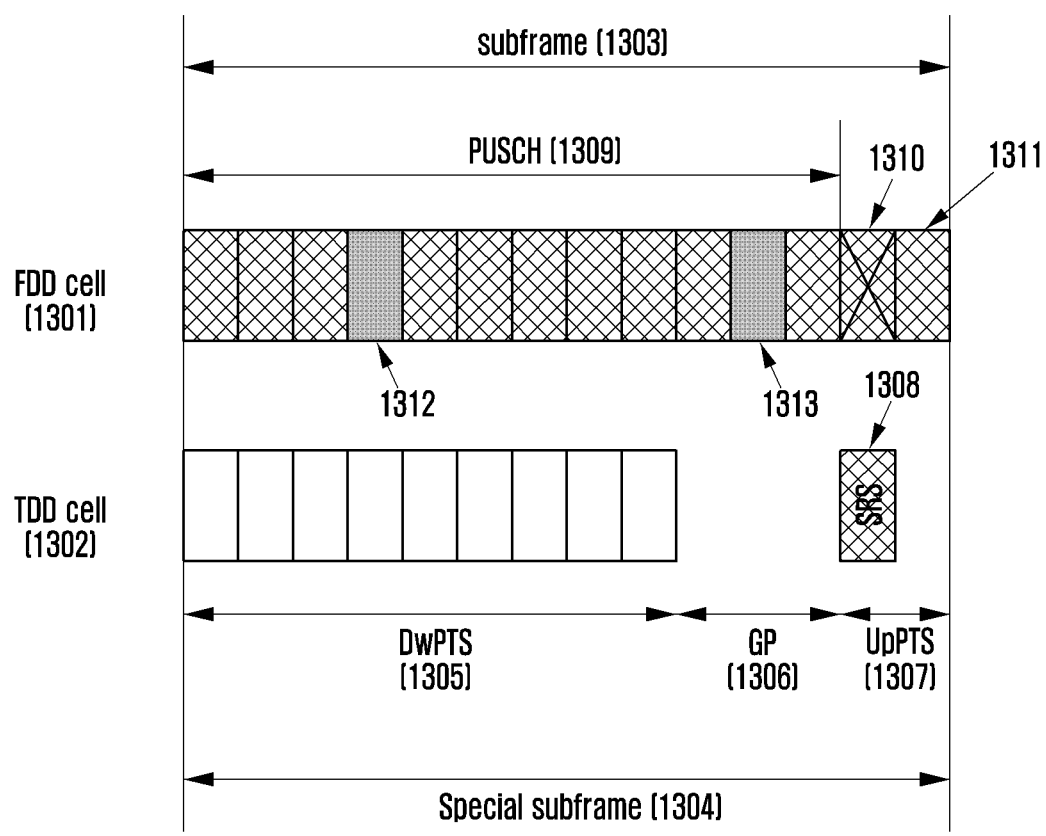
FIG. 13 is a diagram showing Method 2 according to a third embodiment of the present invention.

FIG. 13 is a diagram showing Method 2 according to a third embodiment of the present invention.

Referring to FIG. 13, Method 2 is described below. According to Method 2, UE transmits an SRS symbol 1308 at the first symbol location of the UpPTS interval 1307 corresponding to the time interval of two SC-FDMA symbols in the special subframe 1304 of the TDD cell 1302. For the FDD cell 1301, UE does not transmit PUSCH in an interval 1310 of an SC-FDMA symbol which overlaps with the transmission time point of the SRS symbol 1308 during the UpPTS interval 1307. UE performs rate matching for channel-encoded uplink data, during time intervals 1309 and 1311, except for RS symbol locations 1312 and 1313 and SC-FDMA symbol location 1310 overlapping with the transmission time point of the SRS symbol 1308, within a corresponding subframe 1303 of the FDD cell 1301, thereby configuring and transmitting a PUSCH.

3) Method 3

Figure 14:
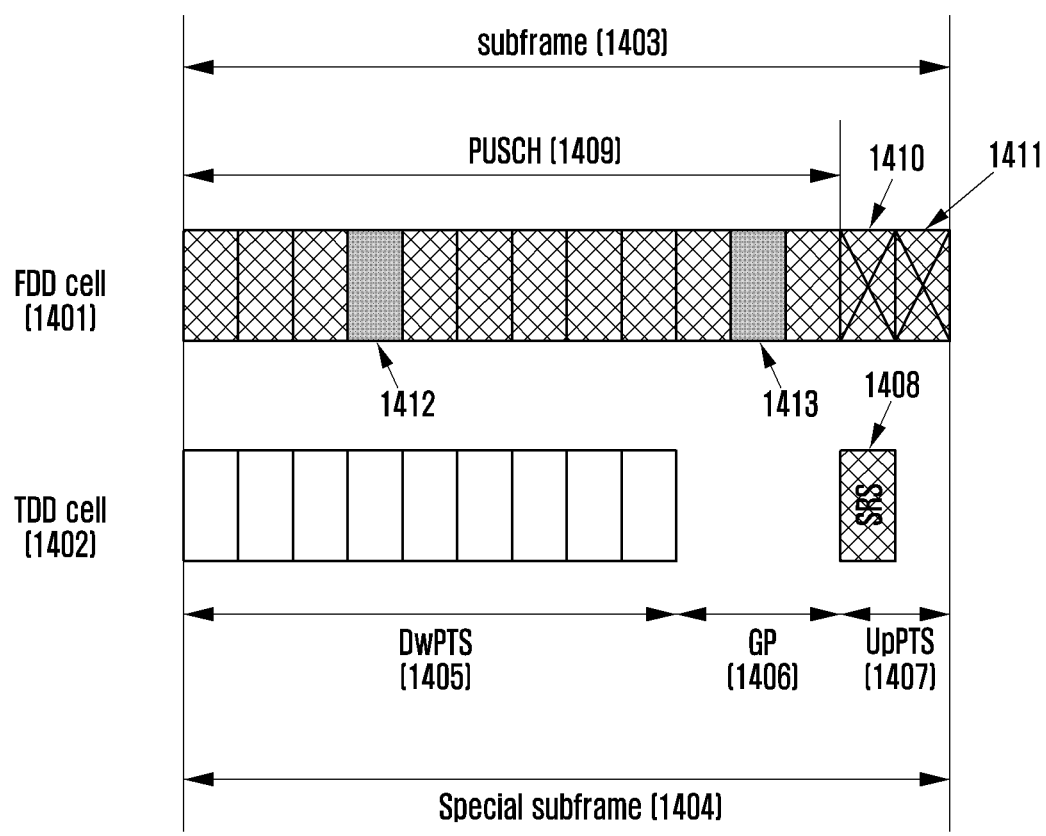
FIG. 14 is a diagram showing Method 3 according to a third embodiment of the present invention.

FIG. 14 is a diagram showing Method 3 according to a third embodiment of the present invention.

Referring to FIG. 14, Method 3 is described below. According to Method 3, UE transmits an SRS symbol 1408 at the first symbol location during the UpPTS interval 1407 corresponding to the time interval of two SC-FDMA symbols in the special subframe 1404 of the TDD cell 1402. For the FDD cell 1401, UE performs rate matching for channel-encoded uplink data over intervals, except for RS symbol locations 1412 and 1413 and the last two SC-FDMA symbols 1410 and 1411 within the subframe 1403 overlapping with a transmission time point of the UpPTS 1407, thereby configuring and transmitting a PUSCH (1409). Method 3 has a feature so that it prioritizes the transmission of SRS over the transmission of PUSCH.

4) Method 4

Figure 15:
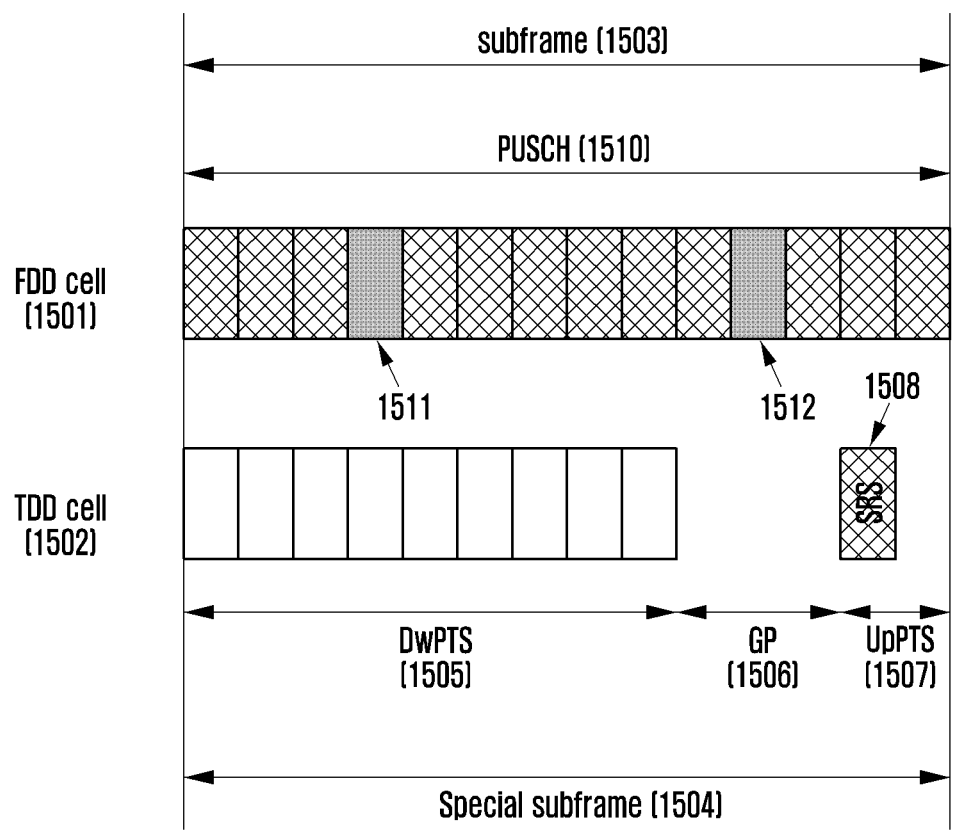
FIG. 15 is a diagram showing Method 4 according to a third embodiment of the present invention.

FIG. 15 is a diagram showing Method 4 according to a third embodiment of the present invention.

Referring to FIG. 15, Method 4 is described below. According to Method 4, UE transmits an SRS symbol 1508 at the first symbol location during the UpPTS interval 1507 corresponding to the time interval of two SC-FDMA symbols in the special subframe 1504 of the TDD cell 1502. For the FDD cell 1501, UE performs rate matching for channel-encoded uplink data over symbols except for the RS symbol locations 1511 and 1512, within a subframe 1503, thereby configuring and transmitting a PUSCH (1410).

In this case, the PUSCH transmission power or the SRS transmission power is adjusted so that the sum of the PUSCH transmission power and the SRS transmission power can be maintained within the maximum allowable transmission power of UE in the location of an SRS symbol 1508 of the UpPTS interval 1507 where uplink signals are simultaneously transmitted to the FDD cell 1501 and the TDD cell 1502. For example, when the PUSCH transmission has priority, the SRS transmission power is adjusted to a value less than a required level of transmission power, so that the sum of the PUSCH transmission power and the SRS transmission power is maintained within the maximum allowable transmission power of UE in the location of the SRS symbol 1508. Alternatively, when the SRS transmission has priority, the PUSCH transmission power is adjusted to a value less than a required level of transmission power, so that the sum of the PUSCH transmission power and the SRS transmission power is maintained within the maximum allowable transmission power of UE in the location of the SRS symbol 1508. Alternatively, each of the SRS transmission power and the PUSCH transmission power is adjusted to a value less than a required level of transmission power, so that the sum of the PUSCH transmission power and the SRS transmission power is maintained within the maximum allowable transmission power of UE in the location of the SRS symbol 1508.

In general, the PUSCH transmission power is constantly maintained within one subframe transmitting PUSCH, thereby simplifying operations of the receiver. Therefore, according to an embodiment, when PUSCH transmission power is adjusted in the location of the SRS symbol 1508 and PUSCH is transmitted, the value of adjusted PUSCH transmission power can also be applied to the interval of the remaining symbols transmitting PUSCH in the subframe as well as the SC-FDMA symbol interval overlapping with the location where the SRS symbol 1508 is transmitted during the UpPTS interval 1507.

When the transmission power of UE is adjusted, eNB is capable of determining a condition as to whether it prioritizes the SRS signal transmission or the PUSCH signal transmission or equalizes the SRS signal transmission and the PUSCH signal transmission regardless of the priority, and then informing the UE of the condition via higher-layer signaling.

In addition, one of the Method 1 to Method 4 is pre-defined as a method to be applied or eNB informs UE of the pre-defined method via higher-layer signaling. Alternatively, in another embodiment, one of the Method 1 to Method 4 may be defined as a method to be applied according to a condition as to whether the PUSCH transmission is initial transmission or re-transmission. For example, when the PUSCH transmission is initial transmission, Method 1 where the PUSCH transmission has priority is applied. When the PUSCH transmission is re-transmission, Method 2 or Method 3 where the SRS transmission has priority is applied. When the PUSCH transmission is re-transmission, the receiver of the eNB has a higher probability of successfully decoding PUSCH via an HARQ process combining the initially transmitted PUSCH with the re-transmitted PUSCH. Therefore, the SRS transmission has a relatively high priority in re-transmitting PUSCH.

Fourth Embodiment

In a fourth embodiment, specified operations are defined when UE needs to simultaneously transmit a PUSCH to an FDD cell and an SRS to a TDD cell, under the condition shown in FIG. 4. The fourth embodiment provides a method for UE to transmit an SRS symbol at the first symbol location to a TDD cell and a PUSCH and an SRS to an FDD cell, during a UpPTS interval.

1) Method 1

Figure 16:
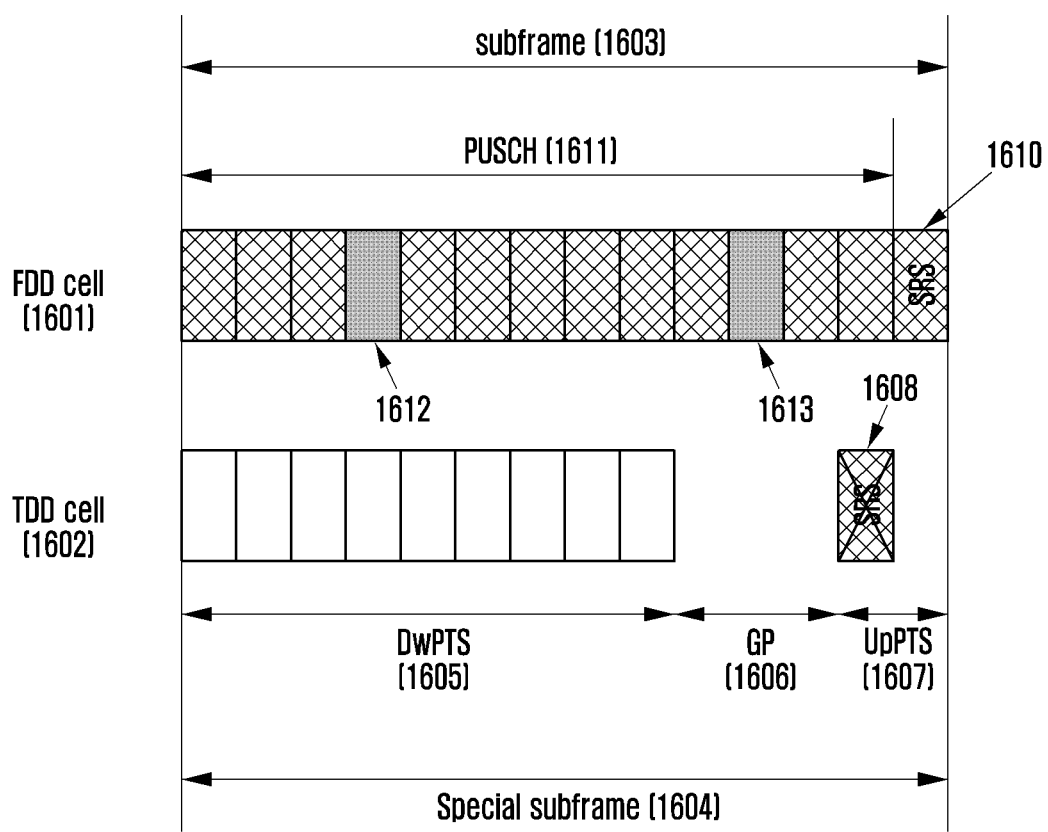
FIG. 16 is a diagram showing Method 1 according to a fourth embodiment of the present invention.

FIG. 16 is a diagram showing Method 1 according to a fourth embodiment of the present invention.

Referring to FIG. 16, Method 1 is described below. According to Method 1, UE maps an SRS to be transmitted to an FDD cell 1601 to the last symbol in a subframe 1603 and transmits the result to the FDD cell 1601, without transmitting an SRS symbol to be transmitted to a TDD cell 1602 (1610). Additionally, Method 1 performs rate matching for data to be transmitted to the FDD cell 1601 during a time interval, except for RS symbol locations 1612 and 1613 and the last symbol interval 1610 transmitting an SRS in the subframe 1603, thereby configuring and transmitting a PUSCH (1611). Method 1 has a feature so that it prioritizes the transmission of uplink signals, i.e., the transmission of PUSCH and SRS, to the FDD cell 1601 to have priority.

2) Method 2

Figure 17:
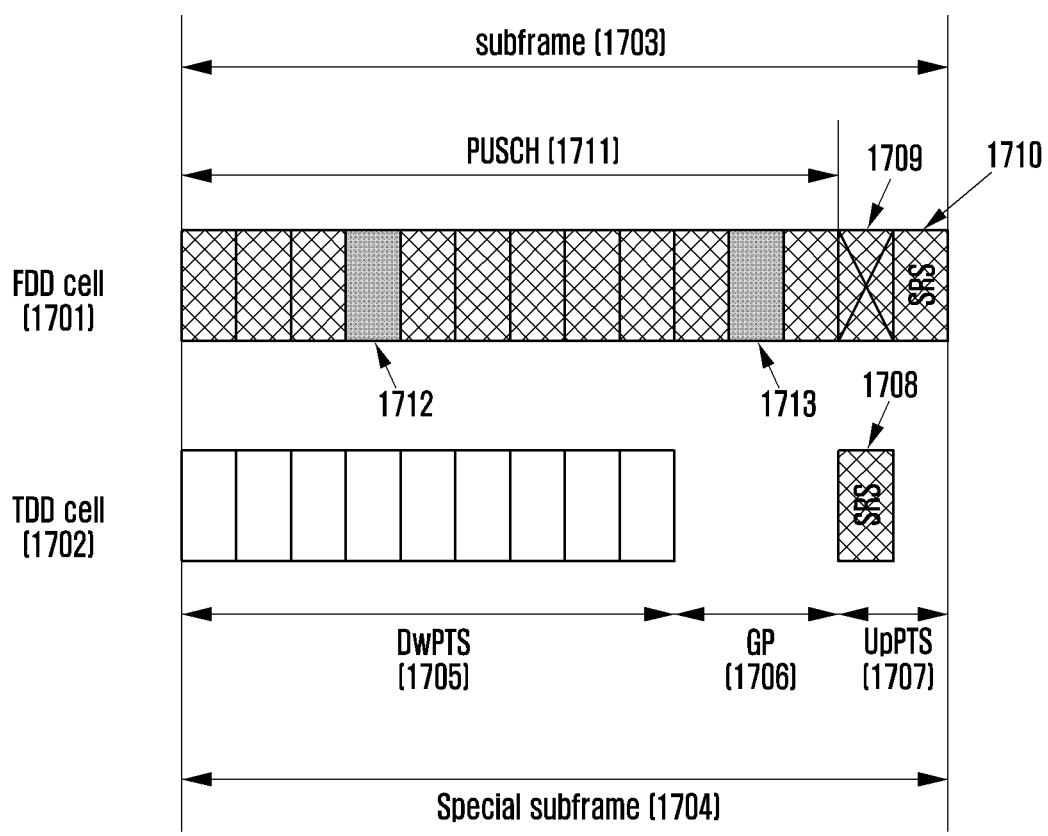
FIG. 17 is a diagram showing Method 2 according to a fourth embodiment of the present invention.

FIG. 17 is a diagram showing Method 2 according to a fourth embodiment of the present invention.

Referring to FIG. 17, Method 2 is described below. According to Method 2, UE transmits an SRS symbol 1708 at the first symbol location of the UpPTS interval 1707 corresponding to the time interval of two SC-FDMA symbols in the special subframe 1704 of the TDD cell 1702.

According to Method 2, UE maps an SRS to be transmitted to an FDD cell 1701 to the last symbol in a subframe 1703 and transmits the result to the FDD cell 1701 (1710). For uplink data to be transmitted to an FDD cell 1701, UE performs rate matching for channel-encoded uplink data over intervals except for RS symbol locations 1712 and 1713 and a UpPTS interval 1707 within a subframe 1703, thereby configuring and transmitting a PUSCH (1711). Therefore, uplink signal transmission is not performed for the last second symbol 1709 of the subframe 1703.

Method 2 has a feature so that it transmits SRS symbols to a TDD cell 1702 whenever possible, despite PUSCH transmission loss which may be caused due to the decrease in the number of symbols configuring a PUSCH transmitted to the FDD cell 1701, thereby allowing eNB to measure a channel state of the TDD cell 1702.

3) Method 3

Figure 18:
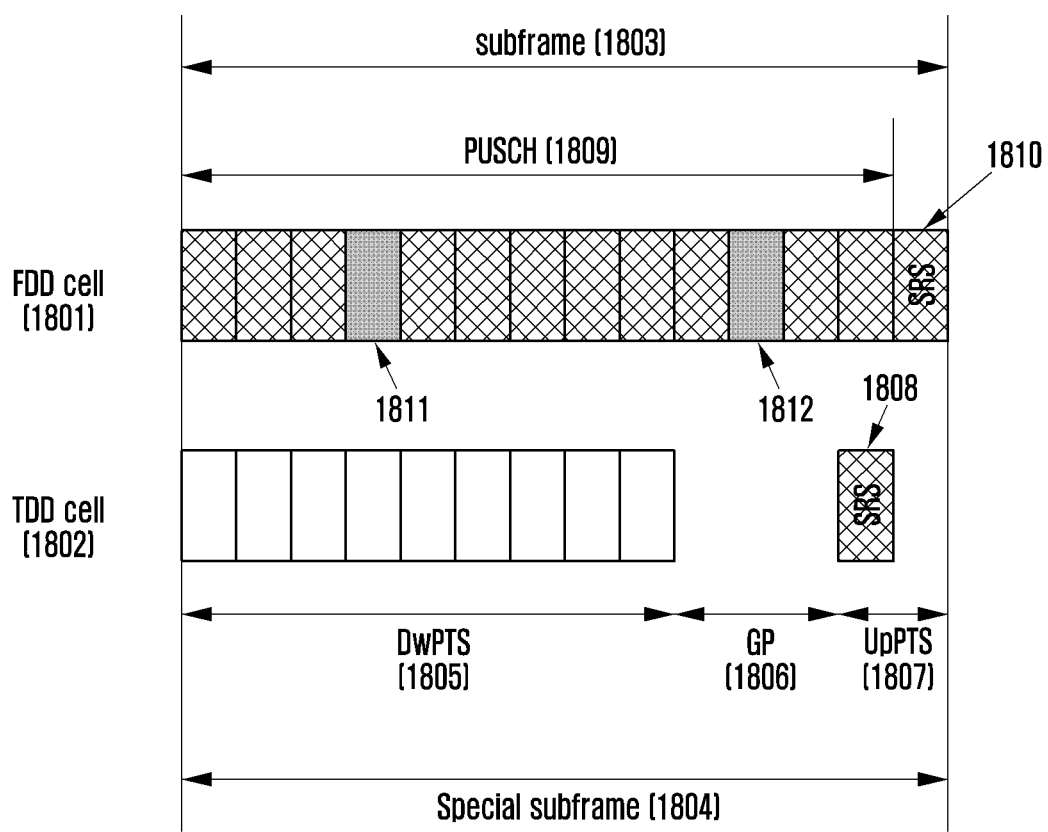
FIG. 18 is a diagram showing Method 3 according to a fourth embodiment of the present invention.

FIG. 18 is a diagram showing Method 3 according to a fourth embodiment of the present invention.

Referring to FIG. 18, Method 3 is described below. According to Method 3, UE transmits an SRS symbol 1808 at the first symbol location during the UpPTS interval 1807 corresponding to the time interval of two SC-FDMA symbols in the special subframe 1804 of the TDD cell 1802. In addition, for an FDD cell 1801, Method 3 maps an SRS to the last symbol 1810 in a subframe 1803 and transmits the result. Additionally, Method 3 performs rate matching for channel-encoded uplink data during time intervals, except for RS symbol locations 1811 and 1812 and the symbol 1810 to which the SRS is mapped, in the subframe 1803 of the FDD cell 1801, thereby configuring and transmitting a PUSCH (1809).

In this case, UE is capable of adjusting transmission power of an uplink signal transmitted to an FDD cell 1801 and transmission power of an uplink signal transmitted to a TDD cell 1802, respectively, so that the sum of the transmission power of an uplink signal transmitted to an FDD cell 1801 and transmission power of an uplink signal transmitted to a TDD cell 1802 does not exceed the maximum allowable transmission power of UE, in the SRS symbol location 1808 of the TDD cell 1802 where the uplink signal transmissions to the FDD cell 1801 and the TDD cell 1802 are simultaneously performed. In addition, like Method 4 of the third embodiment, Method 3 defines the priority according to cells or types of uplink transmission signals, and adjusts the transmission power based on the defined priority.

In general, the PUSCH transmission power is constantly maintained within one subframe transmitting PUSCH, thereby simplifying operations of the receiver. Therefore, according to an embodiment, when PUSCH transmission power is adjusted in a location in an FDD cell 1801, corresponding to a location of the SRS symbol 1808, and the PUSCH is transmitted, the value of adjusted PUSCH transmission power can also be applied to the interval of the remaining symbols transmitting PUSCH in the subframe as well as the SC-FDMA symbol interval overlapping with the location where the SRS symbol 1808 is transmitted, during the UpPTS interval 1807.

When the transmission power of UE is adjusted, eNB is capable of determining a condition as to whether it prioritizes the SRS signal transmission or the PUSCH signal transmission or equalizes the SRS signal transmission and the PUSCH signal transmission regardless of the priority, and then informing the UE of the condition via higher-layer signaling.

In addition, like the first embodiment, one of the Method 1 to Method 3 may be pre-defined as a method to be applied or eNB may inform UE of the pre-defined method via higher-layer signaling. Alternatively, in another embodiment, one of the Method 1 to Method 3 may be defined as a method to be applied according to a condition as to whether the PUSCH transmission is initial transmission or re-transmission. For example, when the PUSCH transmission is initial transmission, Method 1 where the PUSCH transmission has priority is applied. When the PUSCH transmission is re-transmission, Method 2 where the SRS transmission has priority is applied. When the PUSCH transmission is re-transmission, the receiver of the eNB has a higher probability of successfully decoding PUSCH via an HARQ process combining the initially transmitted PUSCH with the re-transmitted PUSCH. Therefore, the SRS transmission has a relatively high priority in re-transmitting PUSCH.

Fifth Embodiment

In a fifth embodiment, specified operations are defined when UE needs to simultaneously transmit a PUSCH containing Uplink Control Information (UCI) to an FDD cell and an SRS to a TDD cell, under the condition shown in FIG. 4.

Uplink Control Information (UCI) refers to control information that UE transmits to eNB via uplink. UCI contains: ACK/NACK representing a condition as to whether downlink data transmitted from eNB to UE fails; Channel Quality Indicator (CQI) representing a status of downlink channel; Rank Indicator (RI) representing a rank of downlink channel; Pre-coding Matrix Indicator (PMI) representing pre-coding information; etc. The ACK/NACK and RI are required to have a relatively high reception capability, compared with the other factors. Therefore, when ACK/NACK and RI are multiplexed with uplink data on PUSCH, the mapping located on the time domain is fixed to be near the RS. This results in a relatively high channel estimation gain, and also a relatively high reception capability.

Figure 19:
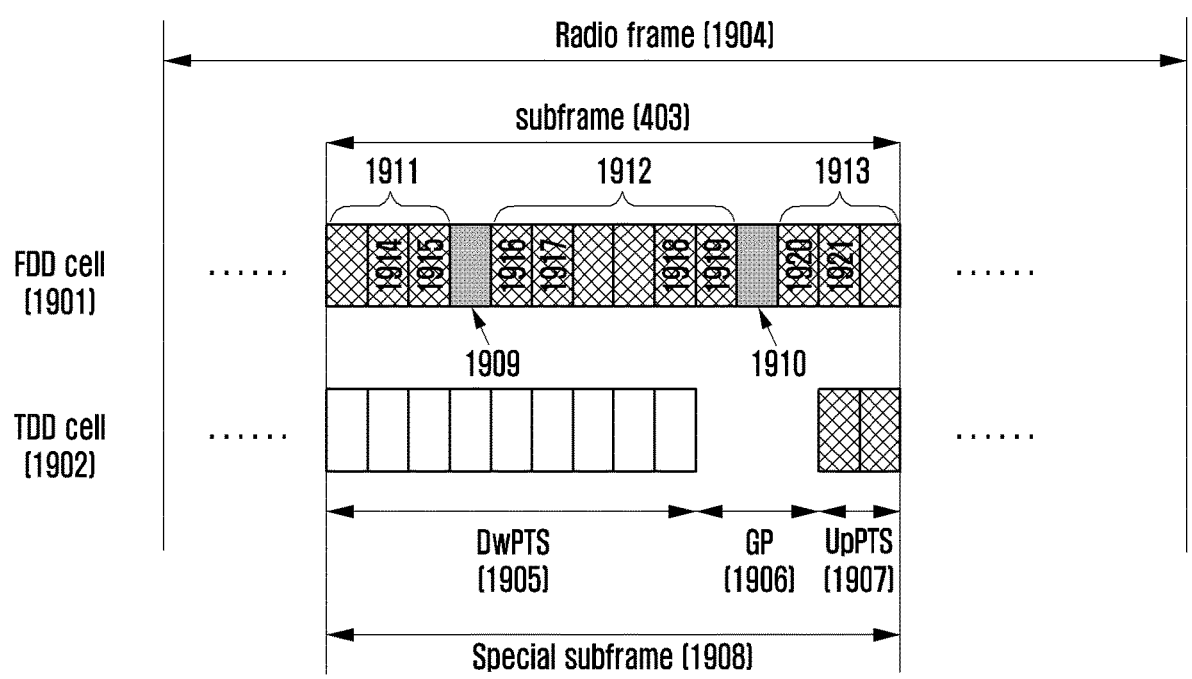
FIG. 19 is a diagram showing a method according to a fifth embodiment of the present invention.

FIG. 19 is a diagram showing a method according to a fifth embodiment of the present invention.

Referring to FIG. 19, ACK/NACK may be multiplexed with uplink data in locations of symbols 1915 and 1916 and symbols 1919 and 1920, immediately adjacent to RS 1909 and RS 1910, respectively, in the subframe. RI may be multiplexed with uplink data in the locations of symbols 1914, 1917, 1918, and 1921 adjacent to the mapping locations of the ACK/NACK.

When an SRS is transmitted during the UpPTS interval 1907 of the TDD cell 1902, the first to fourth embodiments have part of the methods that are not capable of performing uplink signal transmission to the location of the symbol 1921 to which the RI can be mapped. Therefore, when the RI is multiplexed with uplink data and the result is transmitted, a method capable of guaranteeing transmission of the symbol 1921 may be employed, e.g., Method 1, Method 3, and Method 4 of the first embodiment; Method 1 and Method 3 of the second embodiment; Method 1 and Method 4 of the third embodiment; and Method 1 and Method 3 of the fourth embodiment.

Figure 20:
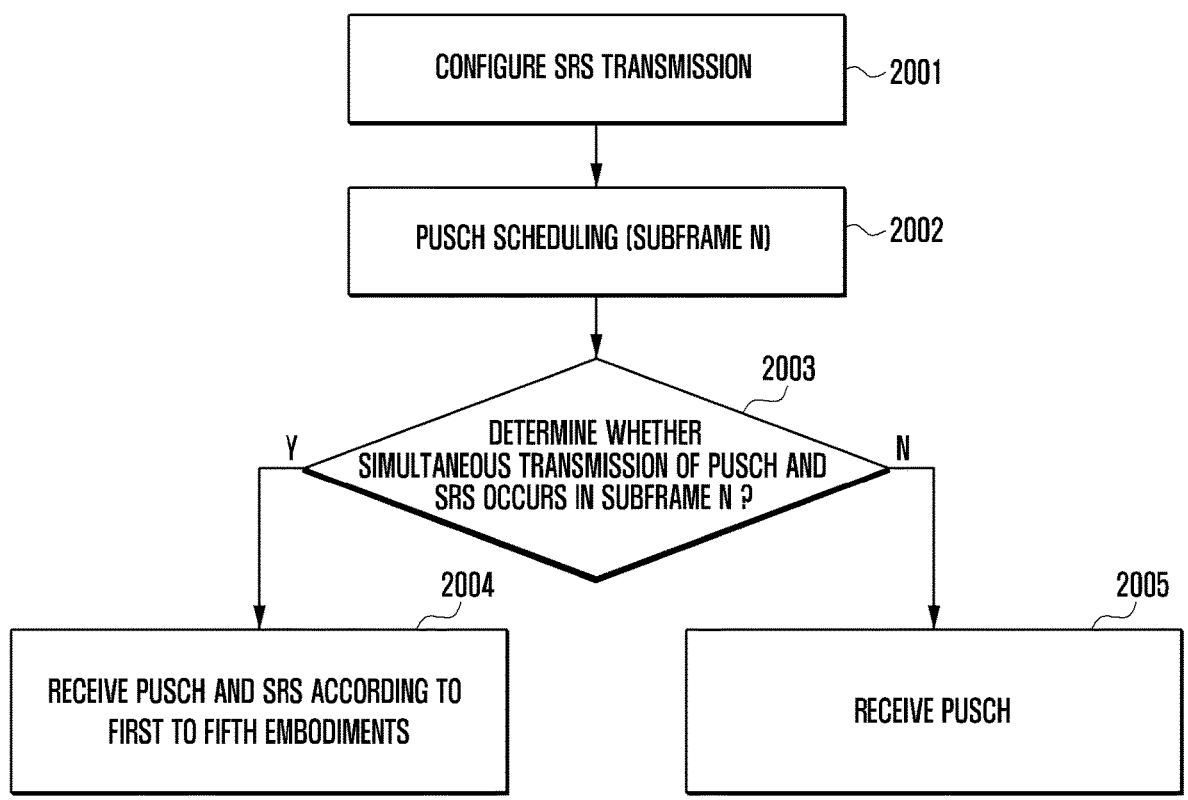
FIG. 20 is a flowchart that describes operations of eNB according to an embodiment of the present invention.

FIG. 20 is a flowchart that describes operations of eNB according to an embodiment of the present invention.

Referring to FIG. 20, the eNB is capable of setting a transmission period, resources for SRS transmission, etc., as control information regarding SRS transmission of UE, and notifies the UE of the settings in operation 2001. The control information may be configured via higher-layer signaling.

The eNB assigns a schedule to UE so that UE can transmit PUSCH in the $n^{th}$ subframe (subframe n) in operation 2002. The eNB determines whether the transmission time points of SRS and PUSCH of the UE overlap with each other within the $n^{th}$ subframe in operation 2003.

When the eNB ascertains that the transmission time points of SRS and PUSCH of the UE do not overlap with each other within the $n^{th}$ subframe in operation 2003, it is capable of receiving PUSCH transmitted from the UE, in the $n^{th}$ subframe in operation 2005.

On the other hand, when the eNB ascertains that the transmission time points of SRS and PUSCH of the UE overlap with each other within the $n^{th}$ subframe in operation 2003, it is capable of receiving PUSCH and SRS from the UE, by using methods of the first to fifth embodiments in operation 2004. Since those methods were described above, their detailed description is omitted below. A method to be applied may be pre-determined between UE and eNB. Alternatively, eNB informs UE of the pre-defined method via higher-layer signaling. The process of higher-layer signaling may be performed before operation 2002 where eNB makes a schedule to enable UE to transmit PUSCH in operation 2002.

Figure 21:
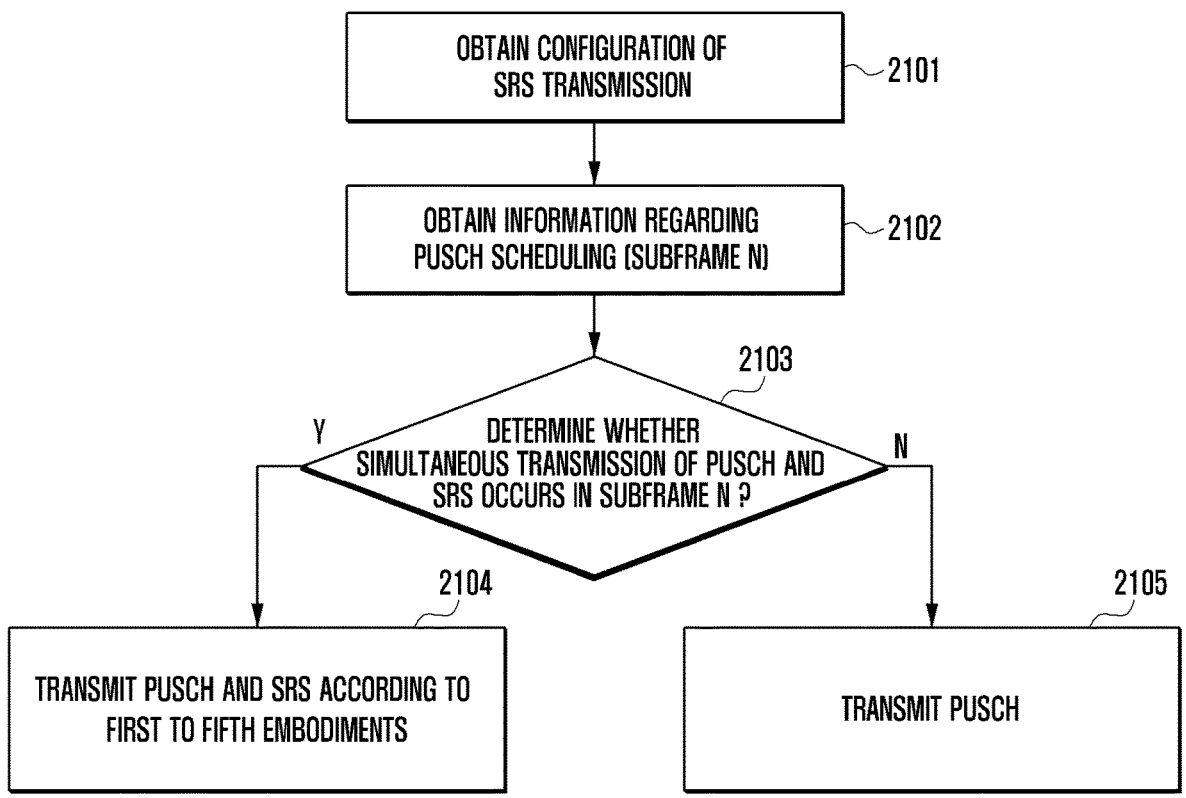
FIG. 21 is a flowchart that describes operations of UE according to an embodiment of the present invention.

FIG. 21 is a flowchart that describes operations of UE according to an embodiment of the present invention.

Referring to FIG. 21, the UE is capable of obtaining a transmission period, resources for SRS transmission, etc., as control information regarding SRS transmission, from eNB in operation 2101. The control information may be configured via higher-layer signaling.

The UE is scheduled by eNB to transmit PUSCH in the $n^{th}$ subframe (subframe n) in operation 2102. The UE determines whether the transmission time points of SRS and PUSCH overlap with each other within the $n^{th}$ subframe in operation 2103.

When the UE ascertains that the transmission time points of SRS and PUSCH do not overlap with each other within the $n^{th}$ subframe in operation 2103, it is capable of transmitting PUSCH in the $n^{th}$ subframe in operation 2105.

On the other hand, when the UE ascertains that the transmission time points of SRS and PUSCH overlap with each other within the $n^{th}$ subframe in operation 2103, it is capable of transmitting SRS and PUSCH, using methods of the first to fifth embodiments, in the $n^{th}$ subframe in operation 2104. Since its detailed description was described in the previous embodiments, it is omitted below.

Figure 22:
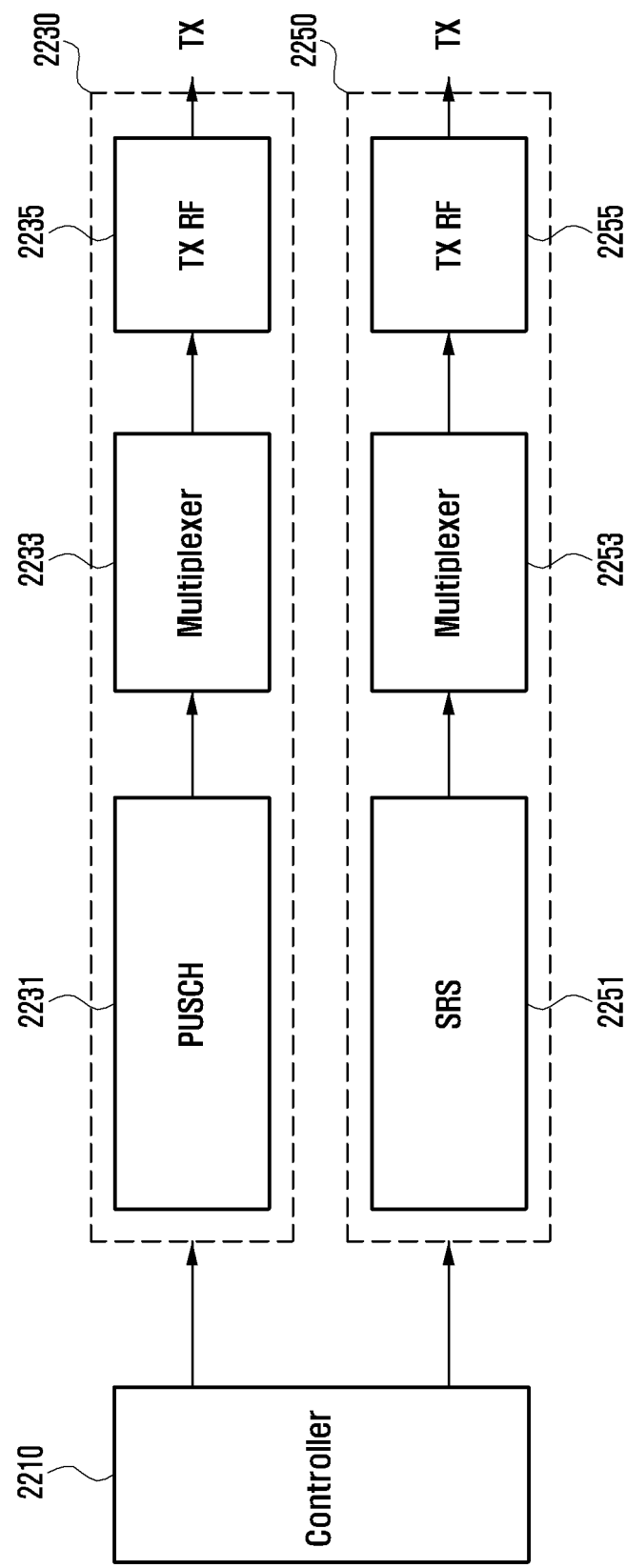
FIG. 22 is a block diagram showing a transmitting device of UE according to an embodiment of the present invention.

FIG. 22 is a block diagram showing a transmitting device of UE according to an embodiment of the present invention.

For the sake of the convenience, detailed descriptions of well-known functions and structures incorporated herein are omitted to avoid obscuring the subject matter of the invention. Referring to FIG. 22, UE is capable of including an FDD cell transmitter 2230, a TDD cell transmitter 2250 and a controller 2210. The FDD cell transmitter 2230 includes a PUSCH block 2231, a multiplexer 2233, and a transmitting RF block 2235. The TDD cell transmitter 2250 includes an SRS block 2251, a multiplexer 2253, and a transmitting RF block 2255. The controller 2210 is capable of controlling the components, included in the FDD cell transmitter 2230 and the TDD cell transmitter 2250, to perform operations related to the PUSCH transmission and SRS transmission by the UE, using the methods of the embodiments described above, referring to control information received from the eNB.

The PUSCH block 2231 of the FDD cell transmitter 2230 creates PUSCH for uplink data by performing processes, such as channel-encoding, modulation, etc. When the UE has uplink transmission signals to be transmitted to an FDD cell, the multiplexer 2233 multiplexes the uplink transmission signals with the created PUSCH. The transmitting RF block 2235 processes the multiplexed signals and transmits the processed signals to the eNB.

The SRS block 2251 of the TDD cell transmitter 2250 creates an SRS signal according to the settings of eNB. When the UE has uplink transmission signals to be transmitted to a TDD cell, the multiplexer 2253 multiplexes the uplink transmission signals with the created SRS signal. The transmitting RF block 2255 processes the multiplexed signals and transmits the processed signals to the eNB.

Figure 23:
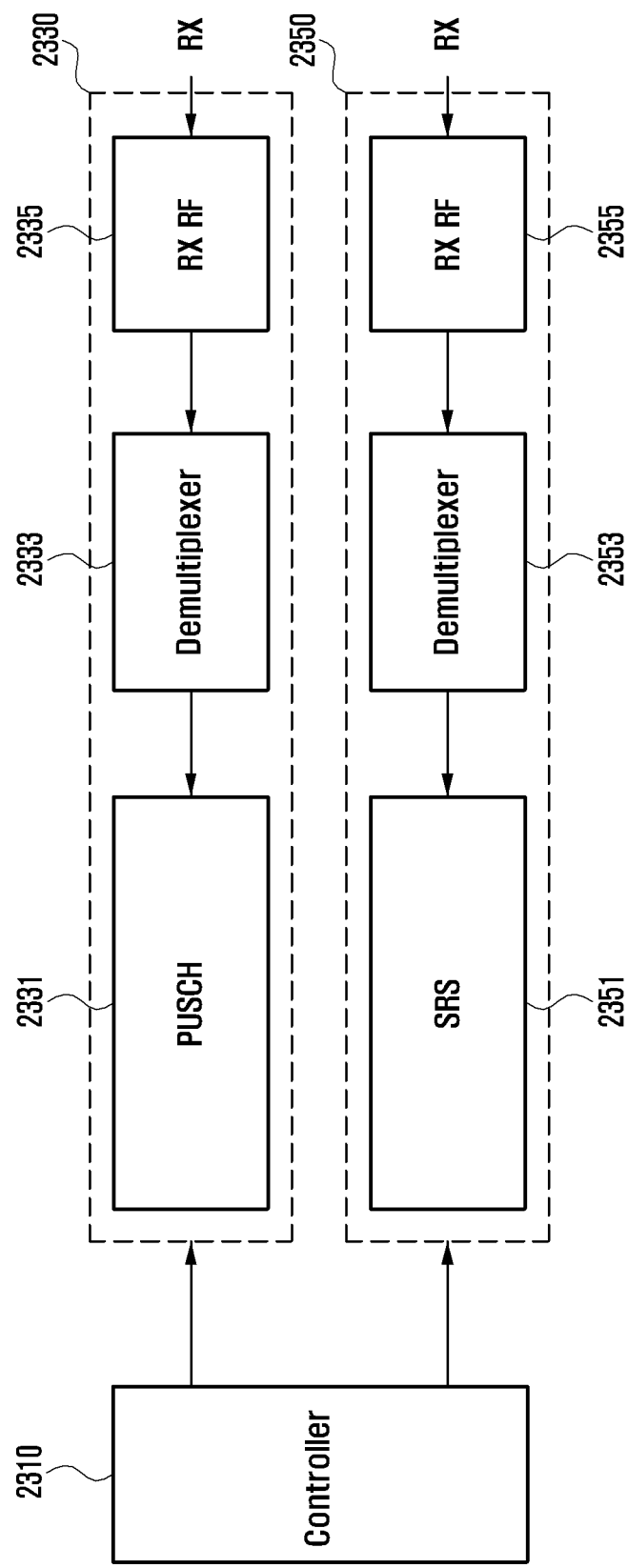
FIG. 23 is a block diagram showing a receiving device of eNB according to an embodiment of the present invention.

FIG. 23 is a block diagram showing a receiving device of eNB according to an embodiment of the present invention.

Referring to FIG. 23, the eNB is capable of including an FDD cell receiver 2330, a TDD cell receiver 2350 and a controller 2310. The FDD cell receiver 2330 includes a PUSCH block 2331, a de-multiplexer 2333, and a receiving RF block 2335. The TDD cell receiver 2350 includes an SRS block 2351, a de-multiplexer 2353, and a receiving RF block 2355. The controller 2310 is capable of controlling the components, included in the FDD cell receiver 2330 and the TDD cell receiver 2350, to perform operations of the eNB related to the reception of SRS and PUSCH transmitted from the UE, using the methods of the embodiments described above.

The FDD cell receiver 2330: processes signals received from the UE via the receiving RF block 2335; separates a PUSCH signal from the processed signals via the de-multiplexer 2333; and performs processes, such as demodulation, channel-decoding, etc., via the PUSCH block 2331, thereby obtaining uplink data.

The TDD cell receiver 2350: processes signals received from the UE via the receiving RF block 2355; separates an SRS signal from the processed signal via the de-multiplexer 2353; and obtains uplink channel status information via the SRS block 2351.

Sixth Embodiment

Figure 24:
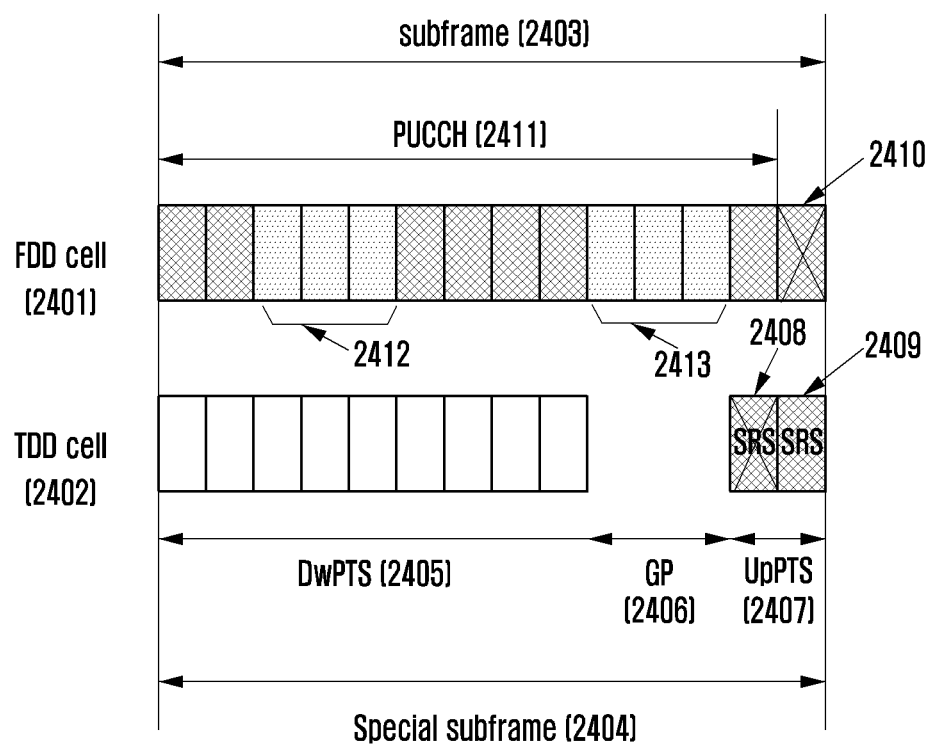
FIG. 24 is a diagram showing a method according to a sixth embodiment of the present invention.

FIG. 24 is a diagram showing a method according to a sixth embodiment of the present invention.

In a sixth embodiment, specified operations are defined when UE needs to simultaneously transmit Uplink Control Information (UCI) to an FDD cell 2401, via a Physical Uplink Control Channel (PUCCH) 2411 for transmitting control information, and an SRS to a TDD cell 2402. Since the UCI was described, in detail, in the fifth embodiment, its description is omitted below.

1) Method 1

Method 1 is related to a case where the transmission interval of SRS is the last one symbol within a subframe.

Referring to FIG. 24, when the transmission time points of PUCCH 2411 and SRS 2409 overlaps with each other within the same subframe, this case employs a shortened PUCCH format where the last one symbol interval 2410 of the PUCCH 2411 within the subframe is not used for transmission. Therefore, UE is capable of transmitting UCI in the shortened PUCCH format during the time interval except for the last symbol interval 2410. UE transmits an SRS 2409 during the last symbol interval of the subframe. This process can prevent a case where PUCCH 2411 and SRS 2409 are simultaneously transmitted at the same time point, thereby maintaining the sum of instantaneous transmission power of UE within the maximum allowable transmission power of UE.

The UE may be previously notified, from eNB, via signaling, of a condition as to whether it can use the shortened PUCCH format. According to an embodiment, when UE is notified from eNB that it is not allowed to use the shortened PUCCH format and the transmission time points of PUCCH and SRS overlap with each other within the same subframe, it transmits PUCCH during the entire time interval of the subframe; however, it may not transmit SRS.

2) Method 2

Method 2 is related to a case where the transmission interval of SRS is the last two symbols or the second-to-last symbol within a subframe.

As shown in FIG. 4, when the UpPTS 407 in a special subframe of the TDD cell 402 is set to have a length corresponding to two SC-FDMA symbols, and SRS transmission to the TDD cell 402 is performed over the two symbols of the UpPTS 407 or in the first symbol interval of the UpPTS 407, there is a need to define operations that differ from those of the Method 1.

That is, when UE is notified from eNB that it is allowed to use the shortened PUCCH format and the transmission time points of PUCCH 2411 and SRS overlap with each other within the same subframe, the UE is capable of transmitting UCI in the shortened PUCCH format during the time interval except for the last one symbol interval 2410 of the subframe. UE transmits the SRS 2409 of the TDD cell 2402 in the last symbol interval of the subframe. UE does not transmit an SRS of the TDD cell 2402 which has been planned to be transmitted in the interval of the second-to-last symbol 2408 within the subframe.

On the other hand, when UE is notified from eNB that it is not allowed to use the shortened PUCCH format and the transmission time points of PUCCH and SRS overlap with each other within the same subframe, it transmits PUCCH 2411 during the entire time interval of the subframe but does not transmit SRS.

Referring to FIG. 24, when UE is set to use the shortened PUCCH format, a detailed description regarding Method 2 is provided as follows.

In a condition where UE is set to use the shortened PUCCH format, the UE does not transmit the first SRS symbol 2408 but transmits the second SRS symbol 2409 during the UpPTS interval 2407 corresponding to a time interval of the two SC-FDMA symbols in the special subframe 2404 of the TDD cell 2402. In this case, for the FDD cell 2401, UE does not transmit PUCCH in the last SC-FDMA symbol interval 2410 overlapping with the transmission time point of the second SRS symbol 2409 of the UpPTS interval 2407. In addition, UE is capable of: configuring PUCCH 2411 in the shortened PUCCH format, from channel-encoded UCI, during a time interval except for the last SC-FDMA symbol location 2410 and RS symbol locations 2412 and 2413, within a corresponding subframe 2403 of an FDD cell 2401; and transmitting it. According to embodiments, RS symbol locations 2412 and 2413 in transmission of PUCCH may differ from RS symbol locations (e.g., 512 and 513 shown in FIG. 5) in transmission of PUSCH.

Figure 25:
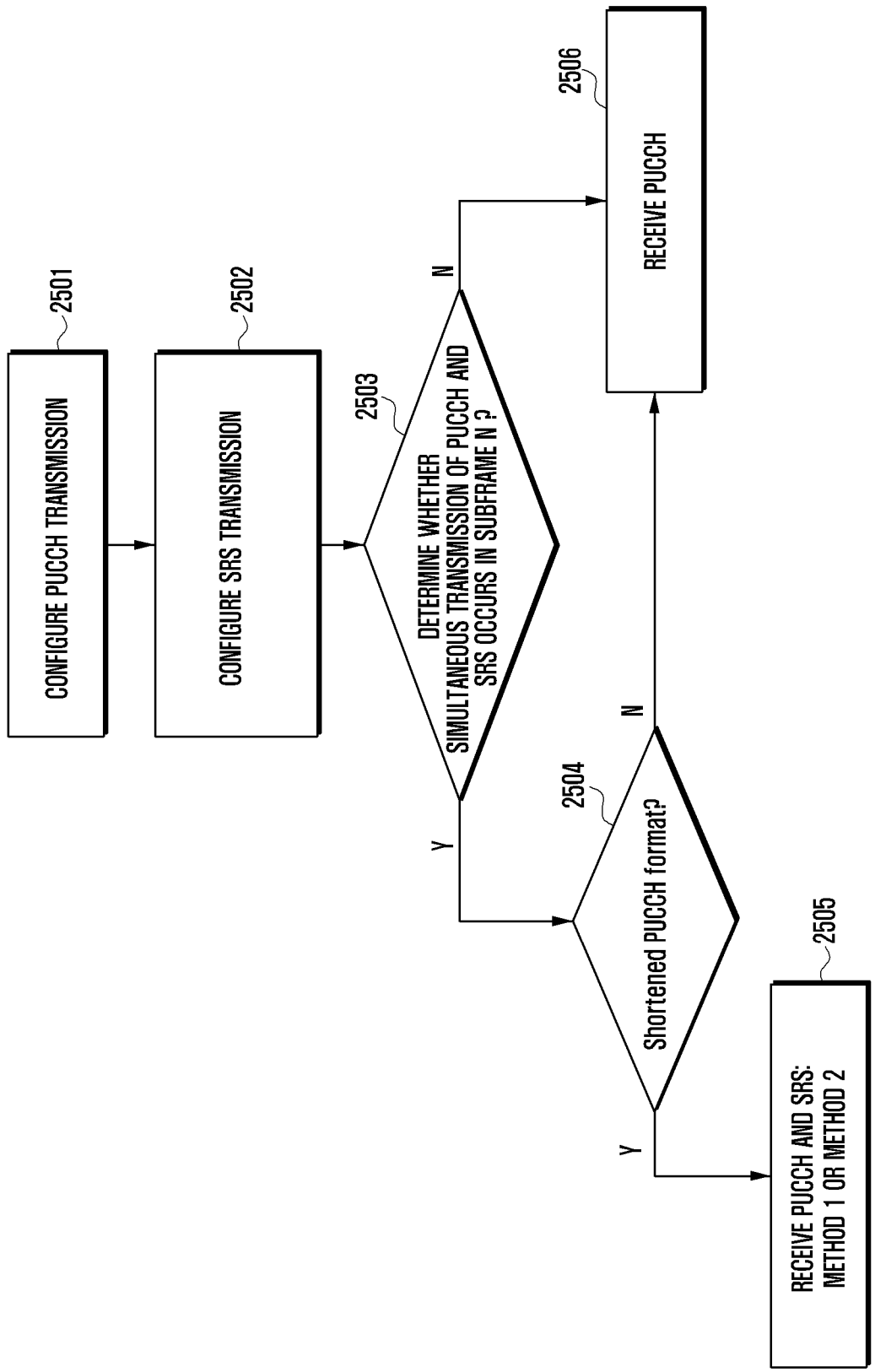
FIG. 25 is a flowchart that describes operations of eNB according to a sixth embodiment of the present invention.

FIG. 25 is a flowchart that describes operations of eNB according to a sixth embodiment of the present invention.

Referring to FIG. 25, the eNB sets control information related PUCCH transmission of UE and notifies the UE of the settings in operation 2501. The control information may contain a condition as to whether UE is allowed to use a shortened PUCCH format, etc. According to embodiments, the control information may be configured via higher-layer signaling.

The eNB is capable of setting control information regarding SRS transmission of UE, such as a transmission period, resources for SRS transmission, etc., and notifies the UE of the settings in operation 2502. According to embodiments, the control information may be configured via higher-layer signaling.

The embodiment may also be modified in such a way that operation 2502 is performed earlier than operation 2501 or they are simultaneously performed.

The eNB determines whether the transmission time points of SRS and PUCCH for UCI transmission of the UE overlap with each other within the $n^{th}$ subframe (subframe #n) used to receive uplink signals from the UE in operation 2503. The eNB may determine the SRS transmission time point of the UE based on the information set in operation 2502. According to embodiments, when the eNB transmits downlink data to the UE at a time point of subframe #n−4 corresponding to subframe #n, it detects that the UE has sent the subframe #n containing HARQ-ACK/NACK via PUCCH.

When the eNB ascertains that the transmission time points of SRS and PUCCH of the UE do not overlap with each other in operation 2503, it is capable of receiving PUCCH transmitted from the UE via the subframe #n in operation 2506. In this case, the PUCCH is a general PUCCH which does not have a shortened PUCCH format.

On the other hand, when the eNB ascertains that the transmission time points of SRS and PUCCH of the UE overlap with each other in subframe #n in operation 2503, it determines whether the UE is set to use a shortened PUCCH format in operation 2504.

When the eNB ascertains that the UE is set to use a shortened PUCCH format in operation 2504, it is capable of receiving SRS and PUCCH in the shortened PUCCH format from the UE, according to Method 1 or Method 2 of the sixth embodiment, in operation 2505. That is, when the transmission interval of SRS is the last one symbol within a subframe, the eNB is capable of receiving SRS and PUCCH via Method 1 of the sixth embodiment. When the transmission interval of SRS is the last two symbols or the second-to-last symbol in a special subframe, the eNB is capable of receiving SRS and PUCCH via Method 2 of the sixth embodiment. Since the detailed description was explained in the previous embodiments, it is omitted below.

On the other hand, when the eNB ascertains that the UE is not set to use a shortened PUCCH format in operation 2504, it is capable of receiving PUCCH transmitted from the UE in operation 2506. In this case, the PUCCH is a general PUCCH which does not have a shortened PUCCH format.

Figure 26:
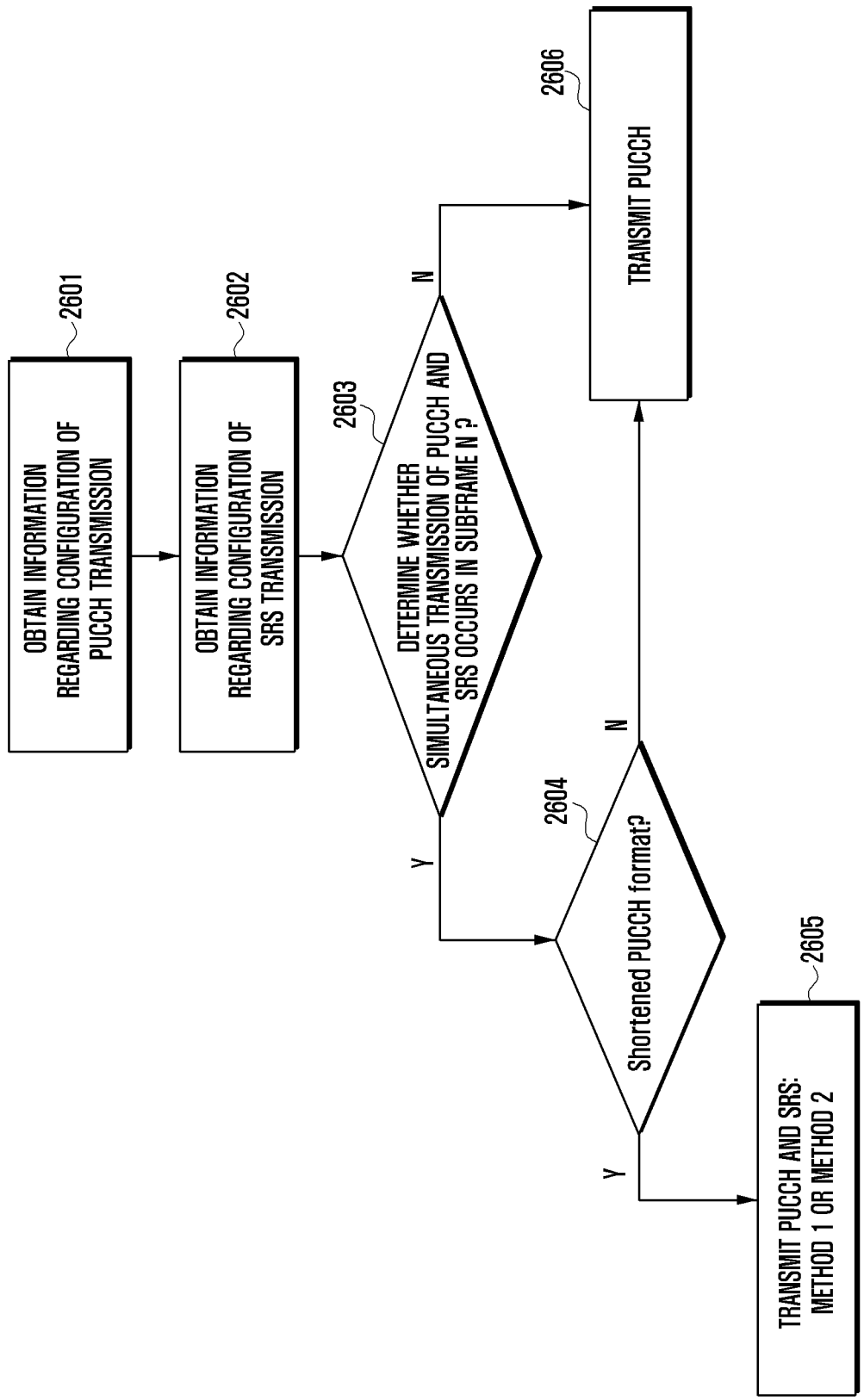
FIG. 26 is a flowchart that describes operations of UE according to a sixth embodiment of the present invention.

FIG. 26 is a flowchart that describes operations of UE according to a sixth embodiment of the present invention.

Referring to FIG. 26, the UE obtains the setup information related to PUCCH transmission from eNB in operation 2601. The setup information may contain control information, such as a condition as to whether UE is allowed to use a shortened PUCCH format, etc.

The UE is capable of obtaining control information regarding SRS transmission, from the eNB, such as a transmission period, resources for SRS transmission, etc., in operation 2602. According to embodiments, the control information may be configured via higher-layer signaling.

The embodiment may also be modified in such a way that operation 2602 is performed earlier than operation 2601 or they are simultaneously performed.

The UE determines whether the transmission time points of SRS and PUCCH overlap with each other within the $n^{th}$ subframe (subframe #n) in operation 2603. The UE may determine the SRS transmission time point based on the SRS setup information obtained in operation 2602. According to embodiments, when the eNB transmits downlink data to the UE at a time point of subframe #n−4 corresponding to subframe #n, the UE sends the subframe #n containing HARQ-ACK/NACK via PUCCH.

When the UE ascertains that the transmission time points of SRS and PUCCH do not overlap with each other within the subframe #n in operation 2603, it is capable of transmitting PUCCH via the subframe #n in operation 2606. In this case, the PUCCH is a general PUCCH which does not have a shortened PUCCH format.

On the other hand, when the UE ascertains that the transmission time points of SRS and PUCCH overlap with each other within the subframe #n in operation 2603, it determines whether it is set to use a shortened PUCCH format according to the setup information of the eNB in operation 2604.

When the UE ascertains that it is set by the eNB to use a shortened PUCCH format in operation 2604, it is capable of transmitting SRS and PUCCH in the shortened PUCCH format, according to Method 1 or Method 2 of the sixth embodiment, in operation 2605. That is, when the transmission interval of SRS is the last one symbol within a subframe, the UE is capable of receiving SRS and PUCCH via Method 1 of the sixth embodiment. When the transmission interval of SRS is the last two symbols or the second-to-last symbol in a special subframe, the UE is capable of receiving SRS and PUCCH via Method 2 of the sixth embodiment. Since the detailed description was explained in the previous embodiments, it is omitted below.

On the other hand, when the UE ascertains that it is not set by the eNB to use a shortened PUCCH format in operation 2604, it is capable of transmitting PUCCH in operation 2606. In this case, the PUCCH is a general PUCCH which does not have a shortened PUCCH format.

Figure 27:
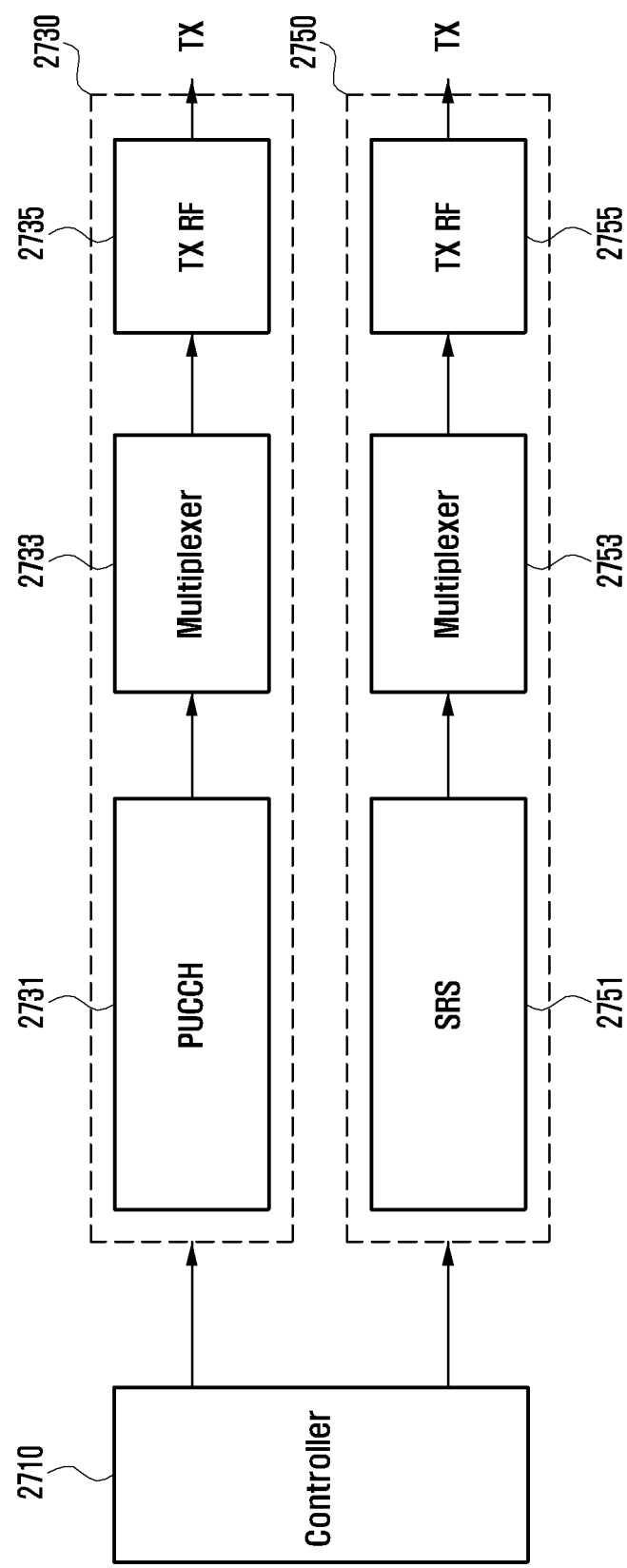
FIG. 27 is a block diagram showing a transmitting device of UE according to another embodiment of the present invention.

FIG. 27 is a block diagram showing a transmitting device of UE according to another embodiment of the present invention.

For the sake of the convenience, detailed descriptions of well-known functions and structures incorporated herein are omitted to avoid obscuring the subject matter of the invention. Referring to FIG. 27, UE is capable of including an FDD cell transmitter 2730, a TDD cell transmitter 2750 and a controller 2710. The FDD cell transmitter 2730 includes a PUCCH block 2731, a multiplexer 2733, and a transmitting RF block 2735. The TDD cell transmitter 2750 includes an SRS block 2751, a multiplexer 2753, and a transmitting RF block 2755. The controller 2710 is capable of controlling the components, included in the FDD cell transmitter 2730 and the TDD cell transmitter 2750, to perform operations related to the PUCCH transmission and SRS transmission by the UE, using the method of the sixth embodiment described above, referring to control information received from the eNB.

The PUCCH block 2731 of the FDD cell transmitter 2730 creates PUCCH for UCI by performing processes, such as channel-encoding, modulation, etc. When the UE has uplink transmission signals to be transmitted to an FDD cell, the multiplexer 2733 multiplexes the uplink transmission signals with the created PUCCH. The transmitting RF block 2735 processes the multiplexed signals and transmits the processed signals to the eNB.

The SRS block 2751 of the TDD cell transmitter 2750 creates an SRS signal according to the settings of eNB. When the UE has uplink transmission signals to be transmitted to a TDD cell, the multiplexer 2753 multiplexes the uplink transmission signals with the created SRS signal. The transmitting RF block 2755 processes the multiplexed signals and transmits the processed signals to the eNB.

Although it is not shown, the FDD cell transmitter 2730 of the UE may further include a PUSCH block. In this case, the controller 2710 is capable of controlling the components, included in the FDD cell transmitter 2730 and the TDD cell transmitter 2750, to perform operations related to the PUSCH transmission and SRS transmission by the UE, using the methods of the first to fifth embodiments described above, referring to control information received from the eNB.

Figure 28:
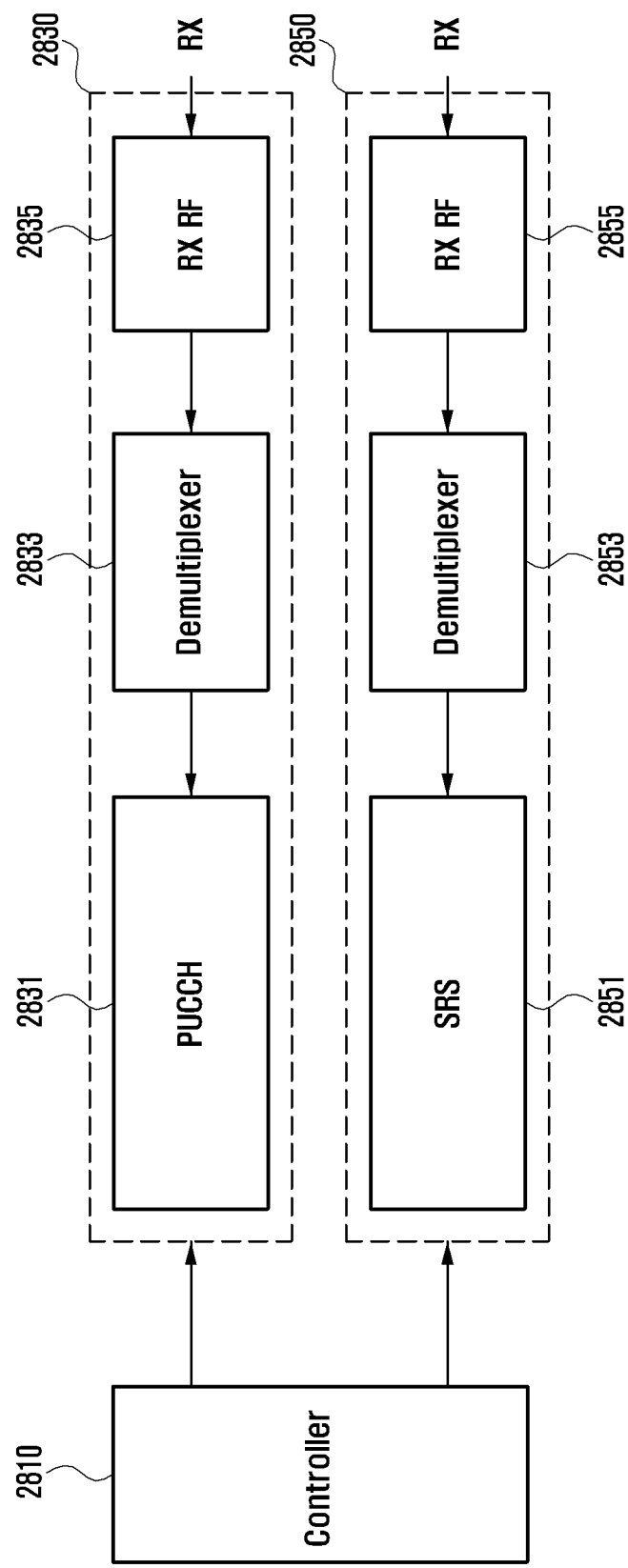
FIG. 28 is a block diagram showing a receiving device of eNB according to another embodiment of the present invention.

FIG. 28 is a block diagram showing a receiving device of eNB according to another embodiment of the present invention.

Referring to FIG. 28, the eNB is capable of including an FDD cell receiver 2830, a TDD cell receiver 2850 and a controller 2810. The FDD cell receiver 2830 includes a PUCCH block 2831, a de-multiplexer 2833, and a receiving RF block 2835. The TDD cell receiver 2850 includes an SRS block 2851, a de-multiplexer 2853, and a receiving RF block 2855. The controller 2810 is capable of controlling the components, included in the FDD cell receiver 2830 and the TDD cell receiver 2850, to perform operations of the eNB related to the reception of SRS and PUCCH transmitted from the UE, using the methods of the sixth embodiment described above.

The FDD cell receiver 2830: processes signals received from the UE via the receiving RF block 2835; separates a PUCCH signal from the processed signals via the de-multiplexer 2833; and performs processes, such as demodulation, channel-decoding, etc., via the PUCCH block 2831, thereby obtaining UCI.

The TDD cell receiver 2850: processes signals received from the UE via the receiving RF block 2855; separates an SRS signal from the processed signal via the de-multiplexer 2853; and obtains uplink channel status information via the SRS block 2851.

Although it is not shown, the FDD cell receiver 2830 of the eNB may further include a PUSCH block. In this case, the controller 2810 is capable of controlling the components, included in the FDD cell receiver 2830 and the TDD cell receiver 2850, to perform operations of the eNB related to the reception of SRS and PUSCH transmitted from the UE, using the methods of the first to fifth embodiments described above.

The embodiments of the present invention described in the description and drawings are merely provided to assist in a comprehensive understanding of the invention and are not suggestive of limitation. It should be understood that the invention may include all modifications and/or equivalents and/or substitutions included in the idea and technical scope of the present disclosure.

Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method of a terminal configured with a first cell and a second cell for transmitting a sounding reference signal (SRS) the method comprising:
   receiving, from a base station, information for configuring an SRS transmission on two symbols in an uplink pilot time slot (UpPTS) on the first cell by higher layer signaling, the first cell operating in a time division duplex (TDD) mode;
   determining that an uplink control information transmission on the second cell overlaps with the SRS transmission on the first cell in a first subframe in terms of time, the second cell operating in a Frequency Division Duplex (FDD) mode;
   identifying whether a shortened physical uplink control channel (PUCCH) format is used to transmit the uplink control information;
   in a case that the shortened PUCCH format is used:
      transmitting, to the base station, the SRS on a second symbol in the UpPTS and dropping the SRS transmission on a first symbol in the UpPTS in the first subframe on the first cell; and
      transmitting, to the base station, uplink control information using the shortened PUCCH format on a plurality of symbols except a last symbol in the first subframe on the second cell;
   in a case that the shortened PUCCH format is not used:
      transmitting, to the base station, uplink control information in the first subframe on the second cell; and
      dropping the SRS transmission in the first subframe on the first cell; and
   in a case that an uplink data transmission on the second cell overlaps with the SRS transmission on the first cell in a second subframe, transmitting, to the base station, the SRS on a second symbol in the UpPTS in the second subframe on the first cell and uplink data on a plurality of symbols except a last symbol in the second subframe on the second cell.

2. A method of a base station operating a first cell and a second cell for receiving a sounding reference signal (SRS) the method comprising:
   transmitting, to a terminal, information for configuring an SRS transmission on two symbols in an uplink pilot time slot (UpPTS) on the first cell by higher layer signaling, the first cell operating in a time division duplex (TDD) mode;
   determining that an uplink control information transmission on the second cell overlaps with the SRS transmission on the first cell in a first subframe in terms of time, the second cell operating in a Frequency Division Duplex (FDD) mode;
   identifying whether a shortened physical uplink control channel (PUCCH) format is used to receive the uplink control information;
   in a case that the shortened PUCCH format is used:
      receiving, from the terminal, the SRS on a second symbol in the UpPTS in the first subframe on the first cell, wherein the SRS is not received on a first symbol in the UpPTS in the first subframe on the first cell; and
      receiving, from the terminal, uplink control information using the shortened PUCCH format on a plurality of symbols except a last symbol in the first subframe on the second cell;
   in a case that the shortened PUCCH format is not used, receiving, from the terminal, uplink control information in the first subframe on the second cell, wherein the SRS is not received in the first subframe on the first cell; and
   in a case that an uplink data transmission on the second cell overlaps with the SRS transmission on the first cell in a second subframe, receiving, from the terminal, the SRS on a second symbol in the UpPTS in the second subframe on the first cell and uplink data on a plurality of symbols except a last symbol in the second subframe on the second cell.

3. A terminal configured with a first cell and a second cell for transmitting a sounding reference signal (SRS) the terminal comprising:
- a transceiver configured to transmit and receive a signal; and
- a controller coupled to the transceiver and configured to control to:
  - receive, from a base station, information for configuring an SRS transmission on two symbols in an uplink pilot time slot (UpPTS) on the first cell by higher layer signaling, the first cell operating in a time division duplex (TDD) mode,
  - determine that an uplink control information transmission on the second cell overlaps with the SRS transmission on the first cell in a first subframe in terms of time, the second cell operating in a Frequency Division Duplex (FDD) mode,
  - identify whether a shortened physical uplink control channel (PUCCH) format is used to transmit the uplink control information,
  - in a case that the shortened PUCCH format is used:
    - transmit, to the base station, the SRS on a second symbol in the UpPTS and drop the SRS transmission on a first symbol in the UpPTS in the first subframe on the first cell, and
    - transmit, to the base station, uplink control information using the shortened PUCCH format on a plurality of symbols except a last symbol in the first subframe on the second cell,
  - in a case that the shortened PUCCH format is not used:
    - transmit, to the base station, uplink control information in the first subframe on the second cell, and
    - drop the SRS transmission in the first subframe on the first cell, and
  - in a case that an uplink data transmission on the second cell overlaps with the SRS transmission on the first cell in a second subframe, transmit, to the base station, the SRS on a second symbol in the UpPTS in the second subframe on the first cell and uplink data on a plurality of symbols except a last symbol in the second subframe on the second cell.

4. A base station operating a first cell and a second cell for receiving a sounding reference signal (SRS) the base station comprising:
- a transceiver configured to transmit and receive a signal; and
- a controller coupled with the transceiver and configured to control to:
  - transmit, to a terminal, information for configuring an SRS transmission on two symbols in an uplink pilot time slot (UpPTS) on the first cell by higher layer signaling, the first cell operating in a time division duplex (TDD) mode,
  - determine that an uplink control information transmission on the second cell overlaps with the SRS transmission on the first cell in a first subframe in terms of time, the second cell operating in a Frequency Division Duplex (FDD) mode,
  - identify whether a shortened physical uplink control channel (PUCCH) format is used to receive the uplink control information,
  - in a case that the shortened PUCCH format is used:
    - receive, from the terminal, the SRS on a second symbol in the UpPTS in the first subframe on the first cell, wherein the SRS is not received on a first symbol in the UpPTS in the first subframe on the first cell, and
    - receive, from the terminal, uplink control information using the shortened PUCCH format on a plurality of symbols except a last symbol in the first subframe on the second cell,
  - in a case that the shortened PUCCH format is not used:
    - receive, from the terminal, uplink control information in the first subframe on the second cell, wherein the SRS is not received in the first subframe on the first cell, and
  - in a case that an uplink data transmission on the second cell overlaps with the SRS transmission on the first cell in a second subframe, receive, from the terminal, the SRS on a second symbol in the UpPTS in the second subframe on the first cell and uplink data on a plurality of symbols except a last symbol in the second subframe on the second cell.

* * * * *